US012766510B2

(12) United States Patent
Spero et al.

(10) Patent No.: US 12,766,510 B2
(45) Date of Patent: Oct. 20, 2026

(54) MICROFLUIDIC DEVICE FOR AND METHODS OF USING SURFACE-ATTACHED POSTS AND CAPTURE BEADS IN A MICROFLUIDIC CHAMBER

(71) Applicant: Redbud Labs, Inc., Research Triangle Park, NC (US)

(72) Inventors: Richard Chasen Spero, Research Triangle Park, NC (US); Jay Kenneth Fisher, Research Triangle Park, NC (US); Dale Barnes, Research Triangle Park, NC (US); Olivia Kanies, Research Triangle Park, NC (US)

(73) Assignee: Redbud Labs, Inc., Research Triangle Park, NC (US)

( * ) Notice: Subject to any disclaimer, the term of this patent is extended or adjusted under 35 U.S.C. 154(b) by 1165 days.

(21) Appl. No.: 17/776,797

(22) PCT Filed: Nov. 16, 2020

(86) PCT No.: PCT/US2020/060653
§ 371 (c)(1),
(2) Date: May 13, 2022

(87) PCT Pub. No.: WO2021/097394
PCT Pub. Date: May 20, 2021

(65) Prior Publication Data

US 2022/0395834 A1 Dec. 15, 2022

Related U.S. Application Data

(60) Provisional application No. 62/936,263, filed on Nov. 15, 2019, provisional application No. 63/053,887, filed on Jul. 20, 2020.

(51) Int. Cl.
*B01L 3/00* (2006.01)

(52) U.S. Cl.
CPC . *B01L 3/502761* (2013.01); *B01L 2200/0668* (2013.01); *B01L 2300/0877* (2013.01); *B01L 2300/123* (2013.01); *B01L 2400/043* (2013.01)

(58) Field of Classification Search
CPC ....... B01L 3/502761; B01L 2200/0668; B01L 2300/0877; B01L 2300/123;
(Continued)

(56) References Cited

U.S. PATENT DOCUMENTS 7,090,774 B1 8/2006 Holman et al.
7,119,645 B2 10/2006 Vicci et al.
(Continued)

FOREIGN PATENT DOCUMENTS

CA 3097960 A1 10/2019
CN 101078718 A 11/2007
(Continued)

OTHER PUBLICATIONS

Liu et al., "A micropillar-integrated smart microfluidic device for specific capture and sorting of cells", Electrophoresis, 28, pp. 4713-4722, 2007. (Year: 2007).*
(Continued)

*Primary Examiner* — Rebecca M Giere
(74) *Attorney, Agent, or Firm* — E. Eric Mills; Nicholas P. Stadnyk; Maynard Nexsen PC

(57) ABSTRACT

A microfluidic device for and methods of using surface-attached posts and capture beads in a microfluidic chamber is disclosed. For example, the microfluidics device includes a pair of substrates separated by a gap and thereby forming a reaction (or assay) chamber therebetween. A field of actuatable surface-attached posts (e.g., magnetically responsive microposts) is provided on one or both of the substrates. The surface-attached posts are functionalized with capture beads. Additionally, methods are provided of functionalizing
(Continued)

the surface-attached posts with the capture beads. Additionally, methods are provided of using the surface-attached posts that are functionalized with capture beads in a microfluidics device for binding a target of interest. Further, a bead spraying system and method is provided for spraying magnetically responsive and/or non-magnetically responsive beads atop and/or among a field of surface-attached microposts for use in a microfluidic device.

17 Claims, 20 Drawing Sheets

(58) Field of Classification Search
CPC ....... B01L 2400/043; B01L 2300/0816; B01L 2300/0887; B01L 2400/0415; B01L 2400/0433; B01L 2400/086; G01N 27/745; G01N 33/54326; G01N 33/54366; G01N 33/0004; G01N 33/18; G01N 33/24
See application file for complete search history.

(56) References Cited

U.S. PATENT DOCUMENTS

| | | | |
|---|---|---|---|
| 7,189,969 | B2 | 3/2007 | Vicci et al. |
| 7,191,092 | B2 | 3/2007 | Vicci et al. |
| 8,490,469 | B2 | 7/2013 | Superfine et al. |
| 8,586,368 | B2 | 11/2013 | Superfine et al. |
| 9,238,869 | B2 | 1/2016 | Superfine et al. |
| 9,612,185 | B2 | 4/2017 | Superfine et al. |
| 9,952,149 | B2 | 4/2018 | Superfine et al. |
| 10,900,896 | B2 | 1/2021 | Spero et al. |
| 10,919,036 | B2 | 2/2021 | Spero et al. |
| 11,179,723 | B2 | 11/2021 | Spero et al. |
| 11,465,146 | B2 | 10/2022 | Spero et al. |
| 11,571,694 | B2 | 2/2023 | Spero et al. |
| 12,179,201 | B2 | 12/2024 | Spero et al. |
| 2007/0266777 | A1 | 11/2007 | Bergman et al. |
| 2008/0176272 | A1 | 7/2008 | Bergman et al. |
| 2009/0220979 | A1 | 9/2009 | Davis et al. |
| 2009/0311800 | A1 | 12/2009 | Bond |
| 2011/0015089 | A1 | 1/2011 | Colen |
| 2012/0071643 | A1 | 3/2012 | Helfer et al. |
| 2012/0156791 | A1 | 6/2012 | Superfine et al. |
| 2014/0342373 | A1 | 11/2014 | Viovy et al. |
| 2016/0209313 | A1 | 7/2016 | Superfine et al. |
| 2018/0229237 | A1 | 8/2018 | Spero et al. |
| 2018/0266951 | A1 | 9/2018 | Spero et al. |

FOREIGN PATENT DOCUMENTS

| | | | | | |
|---|---|---|---|---|---|
| CN | 104805011 | A | | 7/2015 | |
| CN | 107278270 | A | | 10/2017 | |
| CN | 207894807 | U | | 9/2018 | |
| CN | 108872185 | A | | 11/2018 | |
| CN | 109416312 | A | | 3/2019 | |
| CN | 110139713 | A | | 8/2019 | |
| JP | 2002503548 | A | | 2/2002 | |
| JP | 2007530938 | A | | 11/2007 | |
| JP | 2009509143 | A | | 3/2009 | |
| JP | 2012530246 | A | | 11/2012 | |
| JP | 2019510233 | A | | 4/2019 | |
| KR | 101805776 | B1 | | 7/2017 | |
| WO | 2008000031 | A1 | | 1/2008 | |
| WO | 2008103430 | A2 | | 8/2008 | |
| WO | 2010038141 | A1 | | 4/2010 | |
| WO | 2010151780 | A2 | | 12/2010 | |
| WO | 2011045436 | A1 | | 4/2011 | |
| WO | 2013177579 | A2 | | 11/2013 | |
| WO | 2014085804 | A1 | | 6/2014 | |
| WO | 2017049279 | A1 | | 3/2017 | |
| WO | WO-2017219122 | A1 | * | 12/2017 | ........ B01L 3/502761 |
| WO | 2018094245 | A1 | | 5/2018 | |
| WO | 2018183126 | A1 | | 10/2018 | |
| WO | 2018236833 | A1 | | 12/2018 | |
| WO | 2019195818 | A1 | | 10/2019 | |
| WO | 2019221954 | A1 | | 11/2019 | |
| WO | 2020186273 | A1 | | 9/2020 | |
| WO | 2021087449 | A1 | | 5/2021 | |
| WO | 2021097394 | A1 | | 5/2021 | |
| WO | 2021097430 | A1 | | 5/2021 | |
| WO | 2022010982 | A1 | | 1/2022 | |
| WO | 2022010987 | A1 | | 1/2022 | |
| WO | 2022046715 | A1 | | 3/2022 | |
| WO | 2022093949 | A1 | | 5/2022 | |
| WO | 2022197787 | A1 | | 9/2022 | |
| WO | 2023164124 | A1 | | 8/2023 | |

OTHER PUBLICATIONS

Deng Tao et al. 2002. “Fabrication of magnetic microfiltration systems using soft lithography”, Applied Physics Letters, American Institute of Physics, vol. 80, No. 3, p. 461-463.
CN202080092391_Supp search report Dec. 4, 2024.
International Search Report and Written Opinion issued in counterpart PCT Application No. PCT/US2020/060653 dated Feb. 5, 2021 (eight (8) pages).

* cited by examiner

MICROFLUIDIC DEVICE FOR AND METHODS OF USING SURFACE-ATTACHED POSTS AND CAPTURE BEADS IN A MICROFLUIDIC CHAMBER

CROSS REFERENCE TO RELATED APPLICATIONS

The presently disclosed subject matter is a 35 U.S.C. § 371 U.S. national phase entry of International Application No. PCT/US2020/060653 having an international filing date of Nov. 16, 2020, which is related to and claims priority to U.S. Provisional Patent Application No. 62/936,263, entitled "MICROFLUIDIC DEVICE FOR AND METHODS OF USING SURFACE-ATTACHED POSTS AND CAPTURE BEADS IN A MICROFLUIDIC CHAMBER," filed on Nov. 15, 2019, and to U.S. Provisional Patent Application No. 63/053,887, entitled "MICROFLUIDIC DEVICE FOR AND METHODS OF USING SURFACE-ATTACHED POSTS AND CAPTURE BEADS IN A MICROFLUIDIC CHAMBER," filed on Jul. 20, 2020; the entire disclosures of which are incorporated herein by reference.

TECHNICAL FIELD OF THE INVENTION

The presently disclosed subject matter relates generally to the processing of biological materials and more particularly to a microfluidic device for and methods of using surface-attached posts and capture beads in a microfluidic chamber; wherein, the surface-attached posts may be functionalized with the capture beads for high efficiency binding of a target of interest.

BACKGROUND

Microfluidic devices can include one or more active surfaces, which can be, for example, surface-attached microposts in a reaction chamber that are used for capturing target analytes in a biological fluid. Exemplary microfluidic devices include those described in U.S. Pat. Nos. 9,238,869 and 9,612,185, both entitled "Methods and Systems for Using Actuated Surface-Attached Posts for Assessing Biofluid Rheology," which are directed to methods, systems, and computer readable media for using actuated surface-attached posts for assessing biofluid rheology. According to one aspect, a method for testing properties of a biofluid specimen includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion. The method further includes measuring the motion of at least one of the microposts in response to the actuation force and determining a property of the specimen based on the measured motion of the at least one micropost.

Although microfluidic devices such as those described above have been known, there can still be considerable cost and complexity associated with providing target-specific binding properties to one or more active surfaces (e.g., surface-attached microposts) within the reaction chamber of a microfluidic device. In contrast, there are numerous examples of bead-based capture technologies available for bench-top applications (e.g., tube-based applications) that use pre-functionalized beads for specific binding of a target species in a sample fluid for processing and/or analysis. However, routine manipulations, such as pipetting, vortexing, shaking, rotating, and the like, that are commonly used in a benchtop protocol using pre-functionalized beads present several challenges to using bead-based capture in a microfluidic chamber. Therefore, new approaches are needed to integrate existing bead-based capture technologies with the environment of a microfluidic chamber.

SUMMARY OF THE INVENTION

The invention provides a microfluidic cartridge. The microfluidic cartridge may include a housing forming a reaction chamber. The microfluidic cartridge may include a field of surface-attached microposts provided on the housing and extending into the reaction chamber. The microfluidic cartridge may include beads attached to the microposts. The microfluidic cartridge may further comprise openings arranged for flowing fluid into and out of the chamber.

The housing may comprise two substrates separated to form the reaction chamber as a gap between the substrates. The microfluidic cartridge may further include surface-attached microposts that comprise magnetically-responsive microposts that can be actuated using a magnetic actuation mechanism.

In certain embodiments of the invention, the beads may be functionalized. In certain embodiments of the invention, the beads may further comprise target-specific beads.

In certain embodiments of the invention, the target-specific beads may be pre-functionalized with a binding agent that is specific for one or more targets of interest. In certain embodiments of the invention, the pre-functionalized beads may be bound to the surface-attached microposts using a functional group linker.

In certain embodiments of the invention, a chemical bonding reaction may be used to adhere a magnetically-responsive bead to the surface of a micropost.

In certain embodiments of the invention, the pre-functionalized beads may be bound to the surface-attached microposts via nonspecific adsorption of the beads to the microposts.

In certain embodiments of the invention, the pre-functionalized beads may be bound to the surface-attached microposts using a lyophilization process.

In certain embodiments of the invention, a remnant (latent) magnetic field may be generated in the surface-attached microposts, thereby attracting and binding the beads to the microposts via magnetism.

In certain embodiments of the invention, the beads may be bound to at least one substrate surface of the reaction chamber by an ambient magnetic field.

The beads of the invention may comprise a core that is covered by the polymer shell, wherein the polymer shell provides a surface for a subsequent functionalization reaction or reactions. The bead core of the invention may, in certain embodiments, comprise a magnetically-responsive material. In some embodiments, the polymer shell may consist of a polystyrene or a silica-based material.

The invention also provides an instrument. The instrument may include an actuation mechanism and the microfluidic cartridge of the invention, wherein the actuation mechanism generates an actuation force thereby compelling at least a portion of the magnetically-responsive beads of the invention to move. The actuation force may, in some embodiments, be selected from a group that includes a magnetic, thermal, sonic, and/or electric force. The beads may, in certain embodiments, comprise a superparamagnetic material.

The instrument may, in certain embodiments, include surface-attached microposts that are functionalized with a plurality of beads for specific binding of one or more targets of interest.

The microposts of the instrument may, in certain embodiments, be pre-magnetized to create a magnetic field in the microposts.

In certain embodiments of the instrument, magnetically-responsive beads may be bound to the microposts, whereby the beads provide a surface for binding one or more targets of interest.

In certain embodiments of the instrument, the microposts may be maintained in an upright orientation by a lyophilization process.

The instrument may, in certain embodiments, include a bead that is pre-coupled with a ligand. The ligand may, in certain embodiments, be selected from a group consisting of an antibody, a protein, an antigen, a DNA/RNA probe, or any other molecule with an affinity for one or more targets of interest.

The invention also provides a method of capturing a target. The method may include providing the instrument of the invention and causing a sample comprising a target to flow through the reaction chamber of the instrument. The method may include causing the actuation mechanism to generate an actuation force, thereby compelling at least a portion of the magnetically-responsive microposts to move. The method may include contacting the beads attached to the field of microposts and thereby causing the target to bind to the beads.

In certain embodiments, the method may include causing a wash buffer to flow through the reaction chamber. In certain embodiments, the method may include causing the actuation mechanism to generate an actuation force, thereby compelling at least a portion of the magnetically-responsive microposts to move, thereby washing the beads.

In certain embodiments, the method may include causing an elution buffer to flow through the reaction chamber. The method may include, in certain embodiments, causing the actuation mechanism to generate an actuation force, thereby compelling at least a portion of the magnetically-responsive microposts to move, thereby eluting the target from the beads.

The invention also provides a method of applying beads to a field of surface-attached microposts. The method may, in certain embodiments, comprise spraying the beads onto a sheet of microposts. In certain embodiments, the method may include continuing the bead-spraying process for a period of time sufficient to cause the sheet of microposts to be fully layered with beads. In certain embodiments, the method may further comprise dicing the sheet.

The invention also provides a bead-spraying system for providing beads atop and/or among a field of surface-attached microposts in a processing chamber of a microfluidic device. The bead-spraying system may, in certain embodiments, include a translationally-moveable perforated carrier plate supported by an arrangement of rollers.

In certain embodiments, the bead-spraying system may include a spray nozzle or nozzles that are fluidly coupled to a spray supply or supplies provided a certain distance above the perforated carrier plate.

The bead-spraying system may include, in certain embodiments, a vacuum source. The bead-spraying system may include, in certain embodiments, an outtake recovery mechanism provided below the perforated carrier plate.

The bead-spraying system may include, in certain embodiments, a spray supply or supplies that comprise at least one reservoir for holding the beads and at least one reservoir for holding a carrier fluid, whereby the beads and the carrier fluid may be fed separately into the spray nozzle and then mixed in the spray nozzle during a bead-spraying operation.

In certain embodiments of the bead-spraying system, the carrier fluid is a volatile solvent. In certain embodiments, the volatile solvent is selected from a group consisting of a non-ozone-depleting chlorofluorocarbon (CFC) or one of the alcohols.

In certain embodiments of the bead-spraying system, the outtake recovery mechanism comprises a carrier fluid recovery mechanism at the outtake of the processing chamber.

The bead-spraying system may further comprise, in certain embodiments, a temperature control unit provided in the processing chamber for managing the temperature during evaporation of the volatile solvent from the spray nozzle.

In certain embodiments of the bead-spraying system, the vacuum source provides a negative pressure force in the processing chamber.

In certain embodiments of the bead-spraying system, the vacuum source is configured in the processing chamber to ensure airflow from the spray nozzle on one side of the perforated carrier plate toward the outtake recovery mechanism on the opposite side of the perforated carrier plate.

In certain embodiments of the bead-spraying system, the vacuum source and the outtake recovery mechanism are combined into a single unit or module.

In certain embodiments of the bead-spraying system, the rollers advance the perforated carrier plate holding the microposts sheet through the processing chamber during the bead-spraying process.

The bead-spraying system may further comprise, in certain embodiments, a temperature control unit that is provided in the processing chamber for managing the temperature during evaporation of the volatile solvent.

In certain embodiments of the bead-spraying system, the vacuum source and the outtake recovery mechanism are provided on the side of the perforated carrier plate that is opposite from the spray nozzle or nozzles.

In certain embodiments of the bead-spraying system, the microposts sheet may be provided atop the perforated carrier plate to be processed by spraying a quantity of beads thereon.

The bead-spraying system may include, in certain embodiments, a substantially uniform layer of magnetically-responsive and/or non-magnetically-responsive beads being provided atop and/or among a field of surface-attached microposts in a microfluidic device.

The bead-spraying system may include, in certain embodiments, a process of utilizing a mixture of the carrier fluid and the magnetically-responsive and/or non-magnetically responsive beads.

The bead-spraying system may include, in certain embodiments, the volatile solvent substantially evaporating before reaching the field of surface-attached microposts, thereby leaving substantially only the magnetically-responsive and/or non-magnetically-responsive beads reaching the microposts.

In certain embodiments, the perforated carrier sheet of the bead-spraying system may be operated with an x-y translation stage. In certain embodiments, the spray nozzle or nozzles of the bead-spraying system may be operated with an x-y translation stage. In certain embodiments, both the perforated carrier plate and the spray nozzle or nozzles of the bead-spraying system may be operated with an x-y translation stage.

BRIEF DESCRIPTION OF THE DRAWINGS

The features and advantages of the present invention will be more clearly understood from the following description taken in conjunction with the accompanying drawings, which are not necessarily drawn to scale, and wherein.

DETAILED DESCRIPTION OF EXEMPLARY EMBODIMENTS

Figure 1A:
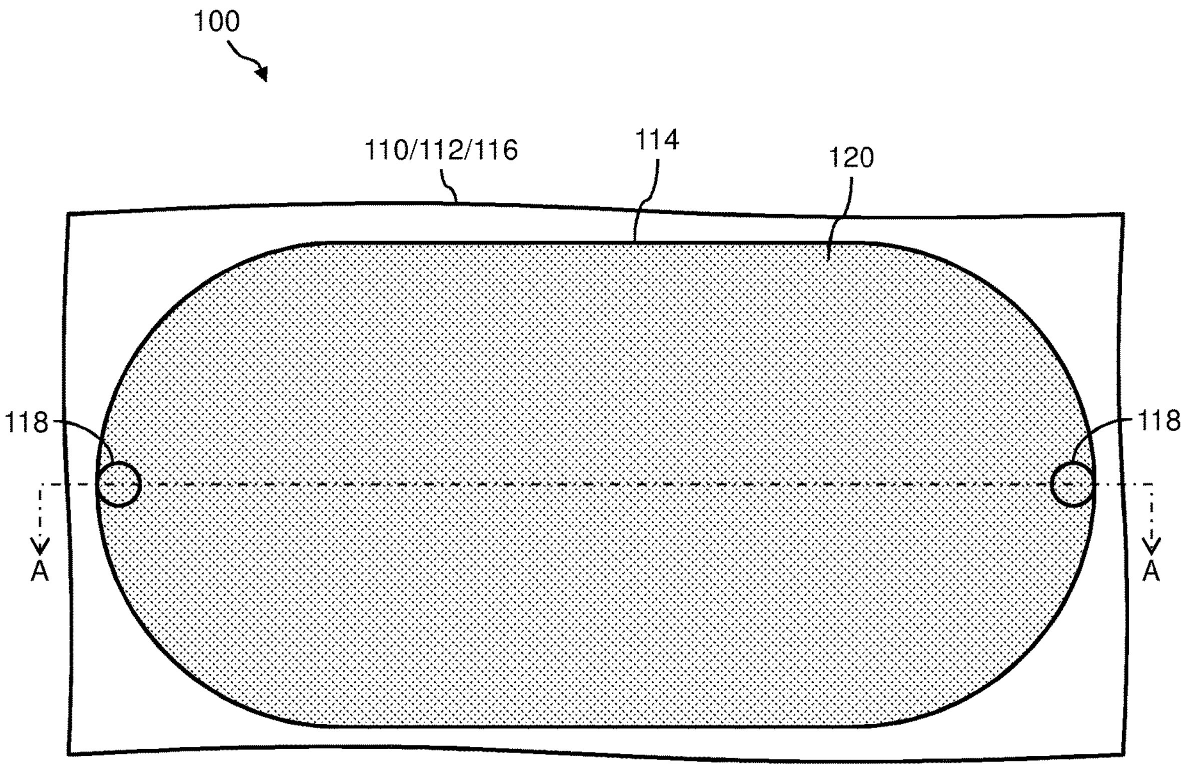
FIG. 1A and FIG. 1B is a plan view and a cross-sectional view, respectively, of an example of a standard microfluidics device that includes a reaction (or assay) chamber, wherein the reaction (or assay) chamber includes a field of microposts that may be functionalized with capture beads.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

General Definitions

As used herein "active surface" means any surface or area that can be used for processing samples including, but not limited to, biological materials, fluids, environmental samples (e.g., water samples, air samples, soil samples, solid and liquid wastes, and animal and vegetable tissues), and industrial samples (e.g., food, reagents, and the like). The active surface can be inside a reaction or assay chamber. For example, the active surface can be any surface that has properties designed to manipulate the fluid inside the chamber. Manipulation can include, for example, generating fluid flow, altering the flow profile of an externally driven fluid, fractionating the sample into constituent parts, establishing or eliminating concentration gradients within the chamber, and the like. Surface properties that might have this effect can include, for example, post technology—whether static or actuated (i.e., activated). The surface properties may also include microscale texture or topography in the surface, physical perturbation of the surface by vibration or deformation; electrical, electronic, electromagnetic, and/or magnetic system on or in the surface; optically active (e.g., lenses) surfaces, such as embedded LEDs or materials that interact with external light sources; and the like.

As used herein, the terms "surface-attached post" or "surface-attached micropost" or "surface-attached structure" or "micropost" are used interchangeably. Generally, a surface-attached structure has two opposing ends: a fixed end and a free end. The fixed end may be attached to a substrate by any suitable means, depending on the fabrication technique and materials employed. The fixed end may be "attached" by being integrally formed with or adjoined to the substrate, such as by a microfabrication process. Alternatively, the fixed end may be "attached" via a bonding, adhesion, fusion, or welding process. The surface-attached structure has a length defined from the fixed end to the free end, and a cross-section lying in a plane orthogonal to the length. For example, using the Cartesian coordinate system as a frame of reference, and associating the length of the surface-attached structure with the z-axis (which may be a curved axis), the cross-section of the surface-attached structure lies in the x-y plane.

Generally, the cross-section of the surface-attached structure may have any shape, such as rounded (e.g., circular, elliptical, etc.), polygonal (or prismatic, rectilinear, etc.), polygonal with rounded features (e.g., rectilinear with rounded corners), or irregular. The size of the cross-section of the surface-attached structure in the x-y plane may be defined by the "characteristic dimension" of the cross-section, which is shape-dependent. As examples, the characteristic dimension may be diameter in the case of a circular cross-section, major axis in the case of an elliptical cross-section, or maximum length or width in the case of a polygonal cross-section. The characteristic dimension of an irregularly shaped cross-section may be taken to be the dimension characteristic of a regularly shaped cross-section that the irregularly shaped cross-section most closely approximates (e.g., diameter of a circle, major axis of an ellipse, length or width of a polygon, etc.).

A surface-attached structure as described herein is non-movable (static, rigid, etc.) or movable (flexible, deflectable, bendable, etc.) relative to its fixed end or point of attachment to the substrate. To facilitate the movability of movable surface-attached structures, the surface-attached structure may include a flexible body composed of an elastomeric (flexible) material, and may have an elongated geometry in the sense that the dominant dimension of the surface-attached structure is its length—that is, the length is substantially greater than the characteristic dimension. Examples of the composition of the flexible body include, but are not limited to, elastomeric materials such as hydrogel and other active surface materials (for example, polydimethylsiloxane (PDMS)).

The movable surface-attached structure is configured such that the movement of the surface-attached structure relative to its fixed end may be actuated or induced in a non-contacting manner, e.g., by an applied magnetic or electric field of a desired strength, field line orientation, and frequency (which may be zero in the case of a magneto static or electrostatic field). To render the surface-attached structure movable by an applied magnetic or electric field, the surface-attached structure may include an appropriate metallic component disposed on or in the flexible body of the surface-attached structure. To render the surface-attached structure responsive to a magnetic field, the metallic component may be a ferromagnetic material such as, for example, iron, nickel, cobalt, or magnetic alloys thereof, one non-limiting example being "alnico" (an iron alloy containing aluminum, nickel, and cobalt). To render the surface-attached structure responsive to an electric field, the metallic component may be a metal exhibiting good electrical conductivity such as, for example, copper, aluminum, gold, and silver, and well as various other metals and metal alloys. Depending on the fabrication technique utilized, the metallic component may be formed as a layer (or coating, film, etc.) on the outside surface of the flexible body at a selected region of the flexible body along its length. The layer may be a continuous layer or a densely grouped arrangement of particles. Alternatively, the metallic component may be formed as an arrangement of particles embedded in the flexible body at a selected region thereof.

As used herein, the term "actuation force" refers to the force applied to the microposts. For example, the actuation force may include a magnetic, thermal, sonic, or electric force. Notably, the actuation force may be applied as a function of frequency or amplitude, or as an impulse force (i.e., a step function). Similarly, other actuation forces may be used without departing from the scope of the present subject matter, such as fluid flow across the micropost array (e.g., flexible microposts that are used as flow sensors via monitoring their tilt angle with an optical system).

Accordingly, the application of an actuation force actuates the movable surface-attached microposts into movement. For example, the actuation occurs by contacting the cell processing chamber with the control instrument comprising elements that provide an actuation force, such as a magnetic or electric field. Accordingly, the control instrument includes, for example, any mechanisms for actuating the microposts (e.g., magnetic system), any mechanisms for counting the cells (e.g., imaging system), any methods for pumping the fluids (e.g., pumps, fluid ports, valves), and a controller (e.g., microprocessor).

As used herein, a "flow cell" is any chamber comprising a solid surface across which one or more liquids can be flowed, wherein the chamber has at least one inlet and at least one outlet.

The term "micropost array" is herein used to describe an array of small posts, extending outwards from a substrate, that typically range from 1 to 100 μm in height. In one embodiment, microposts of a micropost array may be vertically-aligned. Notably, each micropost includes a proximal end that is attached to the substrate base and a distal end or tip that is opposite the proximal end. Microposts may be arranged in arrays such as, for example, the microposts described in U.S. Pat. No. 9,238,869, entitled "Methods and systems for using actuated surface-attached posts for assessing biofluid rheology," issued on Jan. 19, 2016; the entire disclosure of which is incorporated herein by reference. U.S. Pat. No. 9,238,869 describes methods, systems, and computer readable media for using actuated surface-attached posts for assessing biofluid rheology. One method described in U.S. Pat. No. 9,238,869 is directed to testing properties of a biofluid specimen that includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion. This method further includes measuring the motion of at least one of the microposts in response to the actuation force and determining a property of the specimen based on the measured motion of the at least one micropost.

U.S. Pat. No. 9,238,869 also states that the microposts and micropost substrate of the micropost array can be formed of polydimethylsiloxane (PDMS). Further, microposts may include a flexible body and a metallic component disposed on or in the body, wherein application of a magnetic or electric field actuates the microposts into movement relative to the surface to which they are attached (e.g., wherein the actuation force generated by the actuation mechanism is a magnetic and/or electrical actuation force).

"Magnetically responsive" means responsive to a magnetic field. "Magnetically responsive microposts" include or are composed of magnetically responsive materials. Examples of magnetically responsive materials include, but are not limited to, paramagnetic materials, ferromagnetic materials, ferrimagnetic materials, and metamagnetic materials. Examples of suitable paramagnetic materials include iron, nickel, and cobalt, as well as metal oxides, such as, but not limited to, ferroferric oxide ($Fe_3O_4$), barium hexaferrite ($BaFe_{12}O_{19}$), cobalt(II) oxide (CoO), nickel(II) oxide (NiO), manganese(III) oxide ($Mn_2O_3$), chromium(III) oxide ($Cr_2O_3$), and cobalt manganese phosphide (CoMnP).

Following long-standing patent law convention, the terms “a,” “an,” and “the” refer to “one or more” when used in this application, including the claims. Thus, for example, reference to “a subject” includes a plurality of subjects, unless the context clearly is to the contrary (e.g., a plurality of subjects), and so forth.

Throughout this specification and the claims, the terms “comprise,” “comprises,” and “comprising” are used in a non-exclusive sense, except where the context requires otherwise. Likewise, the term “include” and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term “about” even though the term “about” may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term “about,” when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term “about” when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Microfluidic Device for and Methods of Using Surface-Attached Posts and Capture Beads in a Microfluidic Chamber In some embodiments, the presently disclosed subject matter provides a microfluidic device for and methods of using surface-attached posts and capture beads in a microfluidic chamber.

In some embodiments, the presently disclosed microfluidics device includes a pair of substrates separated by a gap and thereby forming a reaction (or assay) chamber between the substrates. A field of the surface-attached posts is provided on one or both of the substrates. The surface-attached posts may be magnetically responsive microposts that can be actuated using magnetic actuation mechanisms. The magnetic actuation mechanisms generate an actuation force that is used to compel at least some of the magnetically responsive microposts to exhibit motion.

In some embodiments, the presently disclosed microfluidics device includes actuatable microposts that are functionalized with a capture bead, whereby the capture beads provide an “active” surface for binding a target of interest. Targets of interest can be, but are not limited to, proteins (e.g., antibodies, catalysts), peptides, nucleic acids, cells, exosomes, and protein complexes.

In some embodiments, the presently disclosed microfluidics device includes actuatable microposts that are functionalized with a target-specific capture bead, whereby the capture beads provide a surface for binding an analyte of interest in a sample fluid.

In some embodiments, the surface of a capture bead is pre-functionalized with a binding agent that is specific for a target of interest. For example, a capture bead can be pre-coupled with a ligand, wherein the ligand can be an antibody, protein or antigen, DNA/RNA probe, or any other molecule with an affinity for a target of interest. The use of pre-functionalized capture beads as a technique for binding specific targets in a sample is well-known and those of ordinary skill in the art will recognize the different types of beads commercially available and their specific applications.

In some embodiments, a pre-functionalized capture bead can be a magnetically responsive bead, such as a paramagnetic or a ferromagnetic bead.

In some embodiments, a pre-functionalized capture bead can be bound to the surface-attached microposts of the presently disclosed microfluidic device via magnetism. In one example, a capture bead can be a superparamagnetic bead such as a Dynabead (available from Thermo Fisher Scientific) with a specific surface functionality.

In some embodiments, a chemical bonding reaction may be used to maximize adhesion of (i.e., “lock”) a magnetically responsive capture bead to the surface of a micropost. For example, a magnetically responsive silica bead bound via magnetism to a micropost formed of polydimethylsiloxane (PDMS) can be “locked” in place using an ultraviolet (UV) bonding protocol.

In some embodiments, a pre-functionalized capture bead can be a non-magnetic bead, such as a polystyrene or a silica bead. In one example, a capture bead can be anti-IgG coated polystyrene microparticles either supplied from a commercial vendor (e.g., polystyrene microparticles available from Spherotech, Inc., Lake Forest, IL) or conjugated in-lab via established methods such as carbodiimide coupling.

In some embodiments, a pre-functionalized capture bead (e.g., a non-magnetic bead) can be bound to the surface-attached microposts of the presently disclosed microfluidic device using a functional group linker. In one example, a functional group linker, such as an avidin (e.g., avidin, streptavidin, neutravidin)/biotin complexation interaction, can be used to attach a capture bead to the surface-attached microposts. In another example, a carboxy group/amine linkage can be used to bind a capture bead to the surface-attached microposts.

In some embodiments, a pre-functionalized capture bead (e.g., a non-magnetic bead) can be bound to the surface-attached microposts of the presently disclosed microfluidic device using chemical bonding, e.g., adhesion or annealing. For example, adhesion between silica and PDMS can be used to attach a silica capture bead to a PDMS micropost.

In some embodiments, a pre-functionalized capture bead can be bound to the surface-attached microposts of the presently disclosed microfluidic device via nonspecific adsorption of the beads to the microposts.

In some embodiments, a pre-functionalized capture bead can be bound to the surface-attached microposts of the presently disclosed microfluidic device using a lyophilization process.

In certain embodiments, a remnant (latent) magnetic field may be generated in the surface-attached microposts, thereby attracting and binding the beads to the microposts via magnetism.

In certain embodiments, the beads may be bound to at least one substrate surface of the reaction chamber by an ambient magnetic field.

In some embodiments, the presently disclosed microfluidics device includes actuatable surface-attached microposts that are functionalized with a capture bead and whereby processing of a binding event occurs in the reaction (or assay) chamber without the actuatable microposts being actuated. For example, the actuatable microposts that are functionalized with a capture bead are held static.

In some embodiments, the presently disclosed microfluidics device includes actuatable surface-attached microposts that are functionalized with a capture bead and whereby processing of a binding event occurs in the reaction (or assay) chamber with the actuatable microposts being actuated. For example, the actuatable microposts that are functionalized with a capture bead are compelled into motion. Accordingly, the mixing action and/or flow created by the actuated capture bead-functionalized microposts in the microfluidics device brings the reactants rapidly into contact with a binding surface as compared with no actuation and/or diffusion alone. Additionally, the mixing action and/or flow created by the actuated capture bead-functionalized microposts in the microfluidics device can be used to facilitate the release of a bound target from a capture bead. The use of capture beads in the microfluidic device with actuatable surface-attached microposts combines the use of existing bead-based capture technologies with enhanced mixing provided by actuating the microposts in a microfluidic environment.

In some embodiments, a captured target of interest can be released from a micropost-bound capture bead using a method that is appropriate for the type of capture bead used. For example, a captured target can be chemically released from the capture beads using a reaction that is based on the chemistry of the capture bead. In one example, a target, such as a protein or an antibody, is bound to a capture bead via a disulfide bond and released from the capture bead using dithiothreitol (DTT) reaction. In another example, a target such as genomic DNA is bound to the capture bead via a pH sensitive linkage such as ChargeSwitch reagent (available from Thermo Fisher Scientific) and released from the capture bead using a buffer exchange reaction (i.e., a change in buffer pH). In yet another example, a target such as a nucleic acid is bound to a capture bead using an oligonucleotide "bait" linker and enzymatically released from the capture bead using a restriction enzyme digestion to cleave the linker, thereby releasing the target nucleic acid.

In some embodiments, a capture bead with bound target thereon can be released from the surface-attached microposts using a method that is appropriate for the binding mechanism used to attach a capture bead to a micropost. For example, a magnetically responsive capture bead with the captured target thereon can be released from the surface-attached microposts using a degaussing procedure to decrease or substantially eliminate any remnant magnetic field of the microposts.

In some embodiments, the presently disclosed microfluidics device includes surface-attached microposts that are functionalized with a capture bead, wherein the capture beads provide a surface for performing a chemical reaction. For example, a catalyst can be bound to a capture bead, wherein the capture bead bound to the surface-attached microposts provides a surface for performing a catalytic reaction in the reaction (or assay) chamber of the microfluidic device.

In some embodiments, the presently disclosed microfluidics device includes surface-attached microposts that are functionalized with a capture bead, wherein the capture beads provide a new functional group or base material to the microposts. For example, a capture bead can include a core (e.g., a magnetically responsive material) that is covered by a polymer shell (e.g., polystyrene, silica), wherein the polymer shell provides a new "base material" for subsequent reactions (e.g., a functionalization reaction).

In some embodiments, the presently disclosed microfluidic device with surface-attached microposts can be provided to the end user at different stages of the capture-bead functionalization process depending on the end-user requirements. For example, a microfluidic device with surface-attached microposts can be provided to an end user with capture beads bound to the microposts (i.e., capture beads are "pre-loaded" on the posts). In another example, a microfluidic device with surface-attached microposts can be provided to an end user with capture beads dried on an opposing surface (i.e., on a surface opposite from the surface-attached microposts). In yet another example, a microfluidic device with surface-attached microposts can be provided to an end user with no capture beads, and wherein the surface-attached microposts are functionalized for subsequent binding of a capture bead flowed into the reaction (or assay) chamber of the microfluidic device during end use.

In some embodiments, the presently disclosed microfluidic device with surface-attached micropost and capture beads can be processed for storage at different stages in a bead-functionalization process using a lyophilization protocol. A lyophilization protocol can be used, for example, to maintain the integrity of the surface-attached microposts and/or the surface chemistry (e.g., functional group) of a capture bead during storage.

In some embodiments a standard lyophilization protocol (e.g., pre-freeze reaction chamber (about −50° C. to about −80° C.) for about 1-2 hrs., primary drying occurs at about −5° C. for about 6-12 hrs. under vacuum @ about 150 mTorr, secondary drying occurs at about 25° C. for about 1-2 hrs. under vacuum @ about 150 mTorr) can be used to process the presently disclosed microfluidic device for storage at different stages in a bead-functionalization process. For example, a microfluidic device with surface-attached microposts and capture beads thereon can be processed for storage using a lyophilization protocol. In another example, a microfluidic device with surface-attached microposts and capture beads dried on an opposing surface can be processed for storage using a lyophilization protocol. In yet another example, a microfluidic device with surface-attached microposts and no capture beads can be processed for storage using a lyophilization protocol and the capture beads are flowed into the reaction (or assay) chamber of the microfluidic device during use by an end user.

In some embodiments, the presently disclosed microfluidic device with pre-magnetized surface-attached microposts and capture beads can be processed for storage using a lyophilization protocol that is performed in the presence of a magnetic field. A lyophilization protocol that is performed in the presence of a magnetic field can be used, for example, to maintain micropost functionality (e.g., the "upright"

orientation of the surface-attached microposts) and/or retain binding of magnetically responsive capture beads to the surface-attached microposts.

Additionally, a method is provided of using a bead-based assay (or reaction) in the presently disclosed microfluidic device. Further, a process and methods are provided of functionalizing surface-attached microposts in the presently disclosed microfluidic device with magnetically responsive capture beads and using the capture bead-functionalized microposts for capture of a target of interest in a sample fluid.

Further, a bead spraying system and method is provided for spraying magnetically responsive and/or non-magnetically responsive beads atop and/or among a field of surface-attached microposts for use in a microfluidic device.

In some embodiments, the presently disclosed bead spraying system and method may be used to support a large-scale continuous manufacturing process with respect to providing magnetically responsive and/or non-magnetically responsive beads atop and/or among a field of surface-attached microposts.

In some embodiments, the presently disclosed bead spraying system and method provide a bead spraying process that utilizes a mixture of carrier fluid (e.g., volatile solvent) and magnetically responsive and/or non-magnetically responsive beads.

In some embodiments, the presently disclosed bead spraying system and method provide a bead spraying process in which the carrier fluid is a volatile solvent that may substantially evaporate before reaching the field of surface-attached microposts and leaving substantially only the magnetically responsive and/or non-magnetically responsive beads reaching the microposts.

In some embodiments, the presently disclosed bead spraying system and method provide a bead spraying process in which a substantially uniform layer or "dusting" or "powder coating" of magnetically responsive and/or non-magnetically responsive beads may be provided atop and/or among a field of surface-attached microposts.

In some embodiments, the presently disclosed bead spraying system and method provide a bead spraying process in which the magnetically responsive and/or non-magnetically responsive beads may be provided loosely atop and/or among a field of surface-attached microposts and wherein the beads are substantially not bound to the surface-attached microposts.

Figure 1B:
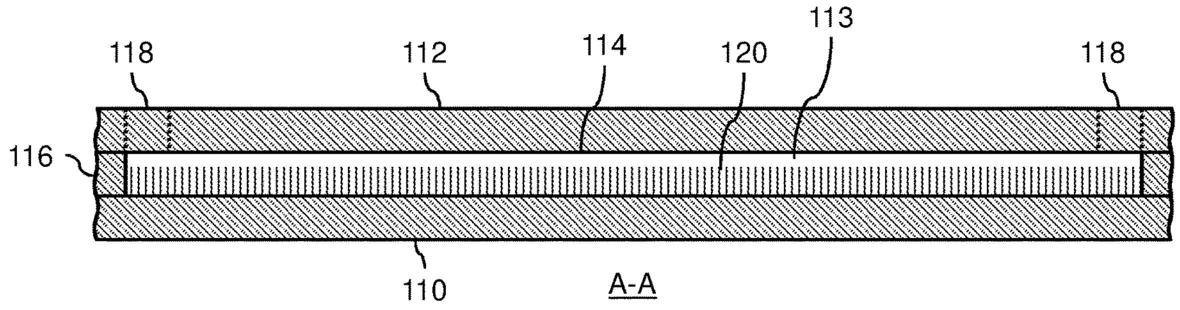

Referring now to FIG. 1A and FIG. 1B is a plan view and a cross-sectional view, respectively, of an example of a standard microfluidics device 100 that includes a reaction (or assay) chamber, wherein the reaction (or assay) chamber includes a field of microposts that may be functionalized with capture beads. FIG. 1B is a cross-sectional view taken along line A-A of FIG. 1A. In one example, the presence of capture beads (not shown) on the microposts serves to functionalize the posts for specific capture of one (or more) target species in a sample fluid. Actuation of the microposts with capture beads (not shown) thereon can be used to facilitate, for example, more rapid mixing action within the chamber for high efficiency binding of a target species in a sample fluid.

In this example, microfluidics device 100 includes a bottom substrate 110 and a top substrate 112 separated by a gap 113, thereby forming a reaction (or assay) chamber 114 between bottom substrate 110 and top substrate 112. A spacer or gasket 116 may be provided between bottom substrate 110 and top substrate 112 to form gap 113 and define the area of reaction (or assay) chamber 114. Bottom substrate 110 and top substrate 112 can be formed, for example, of plastic or glass. Loading ports 118 are provided, for example, in top substrate 112. For example, two loading ports 118 are provided, one at each end (e.g., an inlet and an outlet) for loading liquid into reaction (or assay) chamber 114 and/or for venting. In this example, microfluidics device 100 provides a simple "flow cell" type of chamber. For example, a flow cell can be any chamber comprising a solid surface across which one or more liquids can be flowed, wherein the chamber has at least one inlet and at least one outlet.

Reaction (or assay) chamber 114 of microfluidics device 100 can be sized to hold any volume of fluid. The height of gap 113 of reaction (or assay) chamber 114 can be, for example, from about 50 μm to about 100 μm. Various fluidic operations, such as, but not limited to, mixing operations, washing operations, binding operations, and cell processing operations, can take place within reaction (or assay) chamber 114.

Referring still to FIG. 1A and FIG. 1B, a micropost field 120 is provided on, for example, the inner surface of bottom substrate 110. However, in other embodiments, micropost field 120 can be provided on top substrate 112 (see FIG. 5) or on both bottom substrate 110 and top substrate 112. Again, various fluidic operations, such as, but not limited to, mixing operations, washing operations, binding operations, and cell processing operations, can take place within reaction (or assay) chamber 114.

Micropost field 120 is a substantially continuous field or array of microposts that span the area of reaction (or assay) chamber 114. In any microfluidics device, such as microfluidics device 100, micropost field 120 can be used to facilitate, for example, more rapid mixing action within the chamber as compared to a chamber that is missing the micropost field 120. Additionally, in microfluidics device 100, the microposts of micropost field 120 may be functionalized with capture beads (see FIG. 2 and FIG. 10) for specific binding of one or more target species in a sample fluid that may be flowed into and/or out of reaction (or assay) chamber 114.

Figure 2:
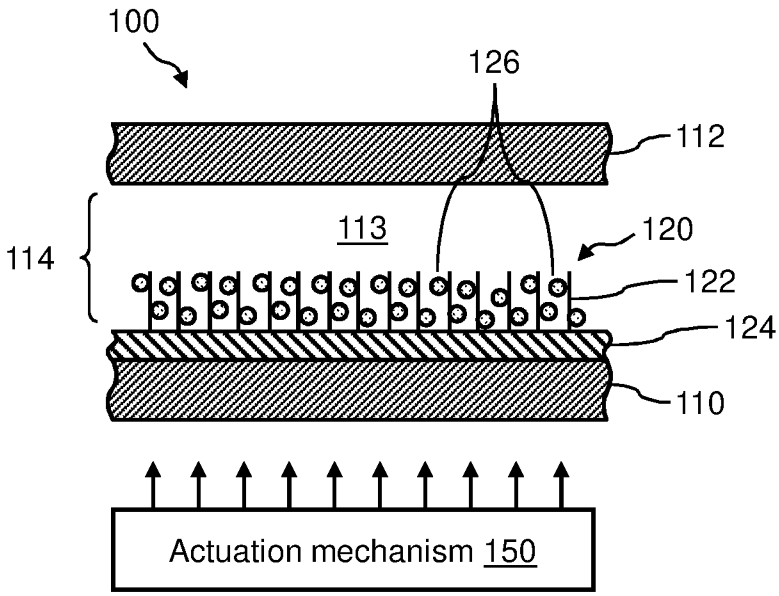
FIG. 2 illustrates a side view of a portion of the reaction (or assay) chamber, wherein the reaction (or assay) chamber includes the field of microposts that may be functionalized with capture beads.

For example, FIG. 2 shows a side view of a portion of reaction (or assay) chamber 114 of microfluidics device 100, wherein reaction (or assay) chamber 114 includes microposts field 120. Micropost field 120 includes a plurality of surface-attached microposts 122 arranged on a substrate 124, wherein the surface-attached microposts 122 can be actuated into movement via an actuation force. For example, the application of a magnetic or electric field actuates the surface-attached microposts 122 into movement. Further, the surface-attached microposts 122 may be functionalized with a plurality of capture beads 126 for specific binding of one or more target species in a sample fluid that may be flowed into and/or out of reaction (or assay) chamber 114.

FIG. 2 shows an actuation mechanism 150 arranged in close proximity to reaction (or assay) chamber 114 of microfluidics device 100. Actuation mechanism 150 can be any mechanism for actuating microposts 122 of micropost field 120 in microfluidics device 100. As used herein, the term "actuation force" refers to the force applied to microposts 122. Actuation mechanism 150 is used to generate an actuation force in proximity to micropost field 120 that compels at least some of microposts 122 to exhibit motion. The actuation force may be, for example, magnetic, thermal, sonic, and/or electric force. Further, the actuation force may be applied as a function of frequency or amplitude, or as an impulse force (i.e., a step function). Similarly, other actuation forces may be used without departing from the scope of the present subject matter, such as fluid flow across micropost field 120. In one example, microposts 122 are magnetically responsive microposts and actuation mechanism 150 may be one of the magnetic-based actuation mechanisms described with reference to U.S. Patent App. No. 62/654,048, entitled "Magnetic-Based Actuation Mechanisms for and Methods of Actuating Magnetically Responsive Microposts in a Reaction Chamber," filed on Apr. 16, 2018; the entire disclosure of which is incorporated herein by reference. More details of microposts 122 are shown and described hereinbelow with reference to FIG. 3A, FIG. 3B, FIG. 4A, and FIG. 4B.

By actuating microposts 122 and causing motion thereof, the sample fluid (not shown) in gap 113 is in effect stirred or caused to flow or circulate within gap 113 of reaction (or assay) chamber 114. Micropost field 120 that includes the arrangement of microposts 122 is based on, for example, the microposts described in the U.S. Pat. No. 9,238,869, entitled "Methods and systems for using actuated surface-attached posts for assessing biofluid rheology," issued on Jan. 19, 2016. The '869 patent describes methods, systems, and computer readable media for using actuated surface-attached posts for assessing biofluid rheology. According to one aspect, a method of the '869 patent for testing properties of a biofluid specimen includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion. The method of the '869 patent further includes measuring the motion of at least one of the microposts in response to the actuation force and determining a property of the specimen based on the measured motion of the at least one micropost.

Figure 3A:
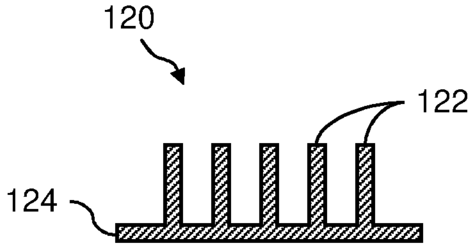
FIG. 3A and FIG. 3B illustrate side views of an example of microposts that may be functionalized with capture beads in the presently disclosed microfluidics device.
Figure 3B:
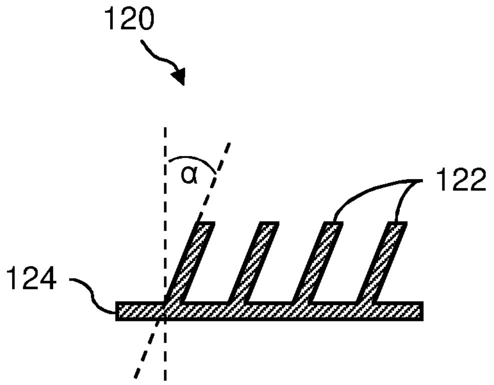

Referring now to FIG. 3A and FIG. 3B is side views of an example of a portion of micropost field 120 in reaction (or assay) chamber 114, wherein microposts 122 may be functionalized with capture beads (not shown) for specific binding of one or more target species in a sample fluid that may be flowed into and/or out of reaction (or assay) chamber 114 of the presently disclosed microfluidics device 100. The term "micropost field" or "micropost array" is herein used to describe a field or an array of small posts, extending outwards from a substrate, that typically range from 1 to 100 μm in height. In one embodiment, microposts of a micropost field or array may be vertically-aligned. Notably, each micropost includes a proximal end that is attached to the substrate base and a distal end or tip that is opposite the proximal end. Accordingly, an arrangement of microposts 122 are provided on a substrate 124.

Microposts 122 and substrate 124 can be formed, for example, of polydimethylsiloxane (PDMS). The length, diameter, geometry, orientation, and pitch of microposts 122 in the field or array can vary. For example, the length of microposts 122 can vary from about 1 μm to about 100 μm. The diameter of microposts 122 can vary from about 0.1 μm to about 10 μm. In one example, microposts 122 are about 50 μm in height and about 9 μmin diameter. Further, the cross-sectional shape of microposts 122 can vary. For example, the cross-sectional shape of microposts 122 can be circular, ovular, square, rectangular, triangular, and so on. The orientation of microposts 122 can vary. For example, FIG. 3A shows microposts 122 oriented substantially normal to the plane of substrate 124, while FIG. 3B shows microposts 122 oriented at an angle $\alpha$ with respect to normal of the plane of substrate 124. In a neutral position with no actuation force applied, the angle $\alpha$ may be, for example, from about 0 degrees to about 45 degrees. Additionally, the pitch of microposts 122 within a micropost field or array can vary, for example, from about 0 μm to about 100 μm. In one example, the pitch of microposts 122 on substrate 124 may range from about 10 μm to about 100 μm (or more) apart. Further, the relative positions of microposts 122 within the micropost field or array can vary.

Figure 4A:
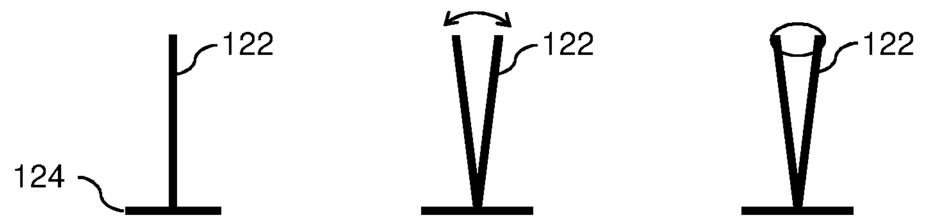
FIG. 4A and FIG. 4B illustrate side views of a micropost and show examples of the actuation motion thereof.
Figure 4B:
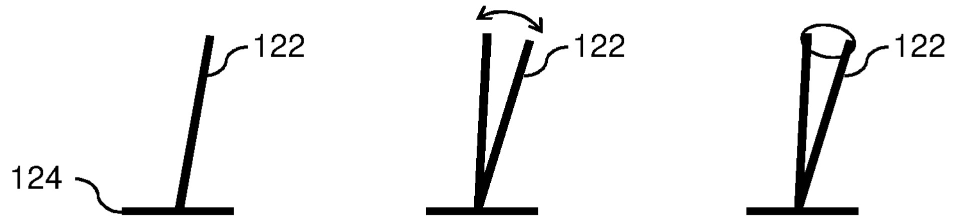

FIG. 4A and FIG. 4B show side views of a micropost 122 and show examples of the actuation motion thereof. Referring now to FIG. 4A, shows an example of a micropost 122 oriented substantially normal to the plane of substrate 124. FIG. 4A shows that the distal end of the micropost 122 can move (1) with side-to-side 2D motion only with respect to the fixed proximal end or (2) with circular motion with respect to the fixed proximal end, which is a cone-shaped motion. By contrast, FIG. 4B shows an example of a micropost 122 oriented at an angle with respect to the plane of substrate 124. FIG. 4B shows that the distal end of the micropost 122 can move (1) with tilted side-to-side 2D motion only with respect to the fixed proximal end or (2) with tilted circular motion with respect to the fixed proximal end, which is a tilted cone-shaped motion. In any microfluidics device 100, by actuating microposts 122 and causing motion thereof, any fluid in reaction (or assay) chamber 114 is in effect stirred or caused to flow or circulate. Further, the cone-shaped motion of micropost 122 shown in FIG. 4A, as well as the tilted cone-shaped motion of micropost 122 shown in FIG. 4B, can be achieved using a rotating magnetic field. A rotating magnetic field is one example of the "actuation force" of a microposts actuation mechanism.

The selection of capture beads used in the presently disclosed microfluidic device 100 may be determined by the intended use of the microfluidic device. Consequently, the size (or size range) of the capture beads and/or the configuration of the field or array of microposts 122 may be varied. In one embodiment, the size (or size range) of a capture bead may be selected to accommodate the configuration of a certain field or array of microposts 122. In another embodiment, the field or array of microposts 122 may be selected to accommodate a specific size (or size range) of a desired capture bead. The size range of commercially available capture beads is varied ranging, for example, from about 10 nm to about 10 (or more) μm. A suspension of capture beads may be a monodispersion, i.e., uniform in size, or a mixture of particle (bead) sizes (e.g., from about 2 μm to about 2.9 μm). The diameter of the capture beads should not exceed the pitch of the micropost field. For example, 5 μm-diameter capture beads may be used in a microfluidic device that includes a 10 μm-pitch micropost field; or 10 nm-diameter capture beads may be used in a microfluidic device that includes a 100 μm-pitch micropost field.

Parameters, such as the size and weight of a capture bead, and the number of capture beads bound on a micropost, may be selected such that orientation of the microposts relative to the plane of the micropost field (e.g., oriented normal to the plane or oriented at an angle $\alpha$ to the plane) remains substantially unchanged. Additionally, the formulation of the microposts in a micropost field may be selected to provide sufficient stiffness to the posts with capture beads thereon such that that orientation of the microposts relative to the plane of the micropost field (e.g., oriented normal to the plane or oriented at an angle $\alpha$ to the plane) remains substantially unchanged.

Figure 5:
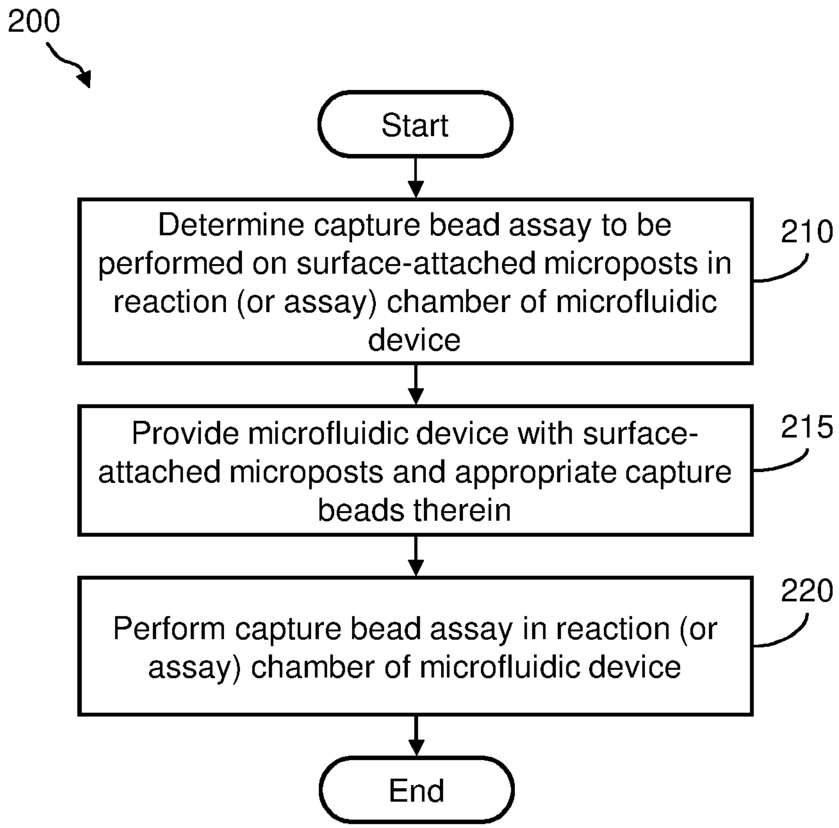
FIG. 5 illustrates a flow diagram of an example of a method of using surface-attached microposts to perform a bead-based capture assay in the reaction (or assay) chamber of the presently disclosed microfluidic device.

FIG. 5 illustrates a flow diagram of an example of a method 200 of using surface-attached microposts to perform a bead-based capture assay in the reaction (or assay) chamber 114 of the presently disclosed microfluidic device 100. Method 200 may include, but is not limited to, the following steps.

At a step 210, the type of capture bead assay to be performed in the environment of surface-attached microposts is determined. For example, a capture target and type of capture bead to be performed in the presently disclosed microfluidics device 100 that includes a field or array of microposts 122 are determined. In one example, the capture target is a cell surface receptor such as CD19 and the capture bead is anti-CD19 magnetic or non-magnetic bead.

At a step 215, a microfluidic device with surface-attached microposts and appropriate capture beads therein is provided. For example, microfluidic device 100 with surface-attached microposts 122 with target-specific pre-functionalized capture beads bound thereon is provided.

At a step 220, the capture bead assay is performed. For example, a sample fluid is flowed into the reaction (or assay) chamber 114 of microfluidic device 100. The capture bead assay is then performed using assay parameters that are suitable for the selected capture bead assay (e.g., incubation temperature, incubation time, mixing, etc.).

In some embodiments, the surface-attached microposts of the presently disclosed microfluidic device 100 are magnetically responsive posts that may be functionalized with magnetically responsive capture beads. The capture beads may, for example, be paramagnetic (e.g., superparamagnetic) or ferromagnetic beads, wherein the capture beads are bound to the surface-attached microposts via magnetism.

In one embodiment, a remnant (latent) magnetic field is first generated in the surface-attached microposts and is then used to attract and bind the capture beads to the micropost surfaces via magnetism. In one example, the remnant magnetic field is generated in the microposts prior to flowing a suspension of magnetically responsive capture beads into the reaction (or assay) chamber. The capture beads are then flowed into the reaction (or assay) chamber in the absence of an applied external magnetic field (e.g., from an actuating magnet). Because the only magnetic field present is the remnant magnetic field in the surface-attached microposts, the magnetically responsive capture beads are preferentially attracted to the microposts.

A remnant magnetic field can be generated in the surface-attached microposts using, for example, a permanent magnet, an electromagnet, or a rotating magnet. Various parameters such as magnetic field strength (e.g., distance of magnet from posts), duration of exposure to magnetic field, rotation speed of a rotating magnet, and orientation of a magnet with regard to proximity to a micropost surface can be selected to provide to sufficient magnetization of the microposts for attracting and binding a capture bead via magnetism.

Figure 6:
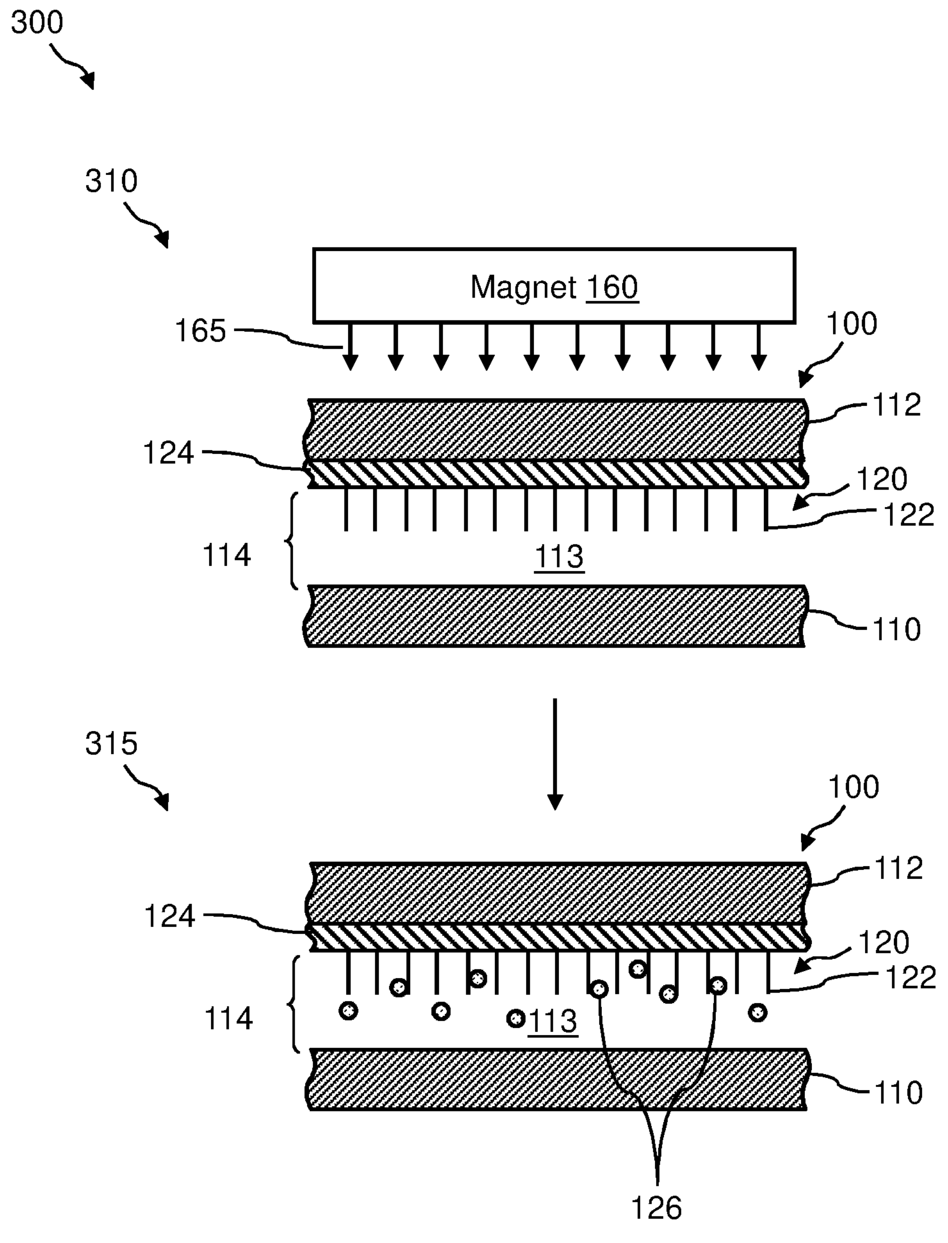
FIG. 6 illustrates an example of a process of functionalizing the surface-attached microposts in a reaction (or assay) chamber with capture beads using a remnant magnetic field generated in the microposts.

FIG. 6 shows an example of a process 300 of functionalizing surface-attached microposts in a reaction (or assay) chamber with capture beads using a remnant magnetic field generated in the microposts. For example, microposts 122 in reaction (or assay) chamber 114 are pre-magnetized to create a magnetic field in the microposts and then magnetically responsive capture beads are bound to the microposts, whereby the capture beads provide a surface for binding an analyte of interest.

At a step 310, a buffer (e.g., phosphate buffered saline (PBS) or water; not shown) is flowed into reaction (or assay) chamber 114 of microfluidic device 100. A magnet 160 is arranged in proximity to microposts 122 in reaction (or assay) chamber 114 of microfluidic device 100. Magnet 160 is used to generate a magnetic field 165 of sufficient strength and duration to magnetize microposts 122. In one example, magnet 160 is a permanent magnet that is positioned in proximity of the top substrate 112 of reaction (or assay) chamber 114 at a certain distance and for a period of time (e.g., from about 30 seconds to about 60 seconds) to generate a magnetic field 165 of sufficient strength to magnetize microposts 122. Magnetic 160 is then moved away from reaction (or assay) chamber 114. Microposts 122 are now magnetized.

In another example, magnet 160 is a rotating magnet that is positioned in proximity of the top substrate 112 of reaction (or assay) chamber 114. The orientation (e.g., in proximity to top substrate 112 or bottom substrate 110), distance from microposts 122, and rotation speed of magnet 160 are selected to generate a magnetic field 165 of sufficient strength to magnetize microposts 122. After a period of time (e.g., from about 30 seconds to about 600 seconds) sufficient to magnetized microposts 122, the rotation of magnet 160 is stopped and the magnet is moved away from reaction (or assay chamber 114). Microposts 122 are now magnetized.

In yet another example, magnet 160 is an electromagnet. The orientation (e.g., in proximity to top substrate 112 or bottom substrate 110) and the distance of magnet 160 from microposts 122 are selected to generate a magnetic field strength sufficient to magnetize microposts 122. In one example, magnet 160 is positioned in proximity of the top substrate 112 of reaction (or assay) chamber 114. Magnetic field 165 is then generated by pulsing magnet 160 for a period of time (e.g., 1 to 10 Hz frequency, 1 to 100 ms duration) to generate magnetic field 165 and magnetize microposts 122. Microposts 122 are now magnetized.

At a step 315, a plurality of magnetically responsive capture beads 126 suspended in a buffer solution are flowed into reaction (or assay) chamber 114. In one example, capture beads 126 are superparamagnetic beads. As capture beads 126 are flowed into reaction (or assay) chamber 114, the remnant magnetic field of microposts 122 attracts capture beads 126 to the microposts, wherein capture beads 126 attach to microposts 122 via magnetism. Because capture beads 126 are flowed into a pre-magnetized reaction (or assay) chamber 114, capture beads 126 are evenly distributed on the surface of microposts 122.

In some embodiments (not shown), magnetically responsive capture beads 126 may be degaussed to remove any remnant magnetism and disperse bead aggregates prior to flowing the suspension of capture beads 126 into reaction (or assay) chamber 114.

In some embodiments (not shown), a sonication procedure to disperse bead aggregates can be performed on the suspension of magnetically responsive capture beads 126 prior to prior to flowing the suspension of capture beads 126 into reaction (or assay) chamber 114.

In some embodiments (not shown), an actuation mechanism may be positioned in proximity to reaction (or assay) chamber 114 of microfluidic device 100 and used to actuate microposts 122. By actuating microposts 122 and causing motion thereof, the suspension of capture beads 126 in reaction (or assay) chamber 114 is in effect stirred to produce a more homogenous distribution of beads, thereby facilitating binding of capture beads 126 to microposts 122.

In some embodiments, a chemical bonding reaction may be used to maximize adhesion of (i.e., "lock") a magnetically responsive capture bead 126 to the surface of microposts 122. For example, a magnetically responsive silica bead bound via magnetism to a micropost formed of polydimethylsiloxane (PDMS) can be "locked" in place using an ultraviolet (UV) bonding protocol.

Figure 7:
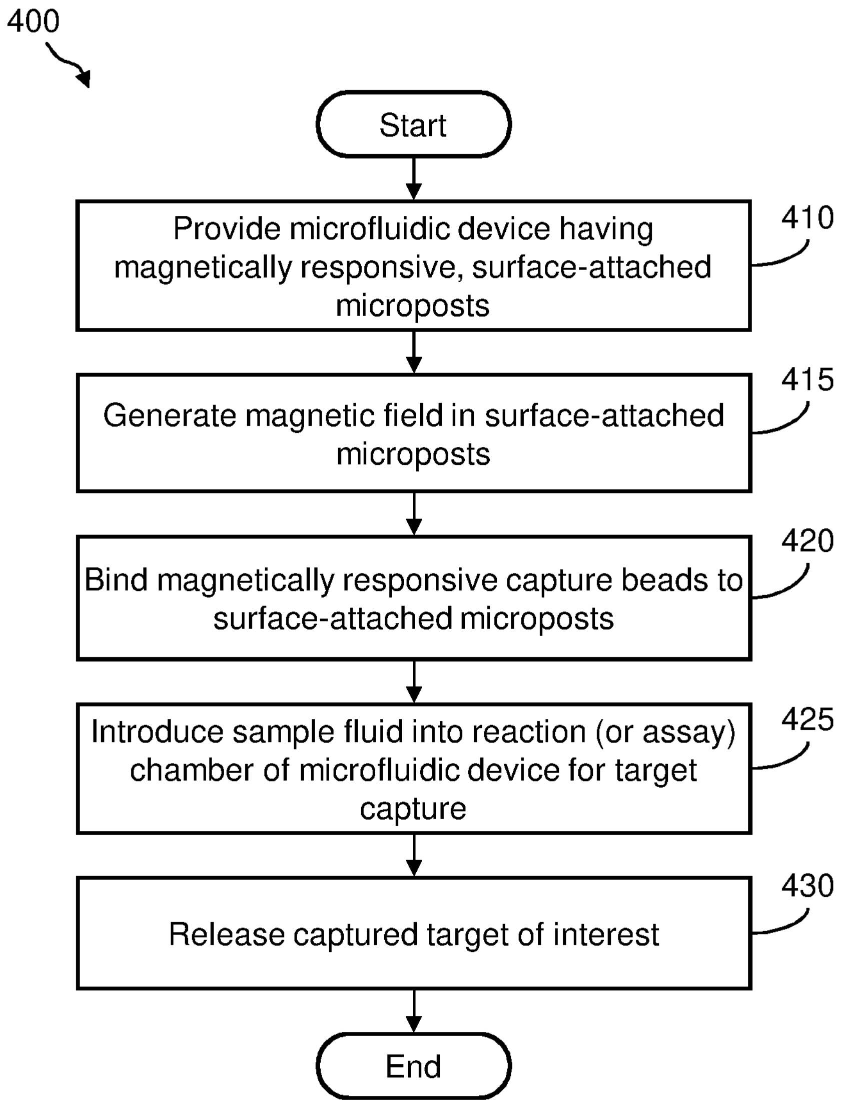
FIG. 7 illustrates a flow diagram of an example of a method of using the surface-attached posts and magnetically responsive capture beads in a microfluidic device for capture of a target of interest in a sample fluid.

FIG. 7 illustrates a flow diagram of an example of a method 400 of using surface-attached posts and magnetically responsive capture beads in a microfluidic device for capture of a target of interest in a sample fluid. For example, microposts 122 in reaction (or assay) chamber 114 of microfluidic device 100 are pre-magnetized to create a remnant magnetic field in the microposts and then the capture beads are flowed into reaction (or assay) chamber 114 and bound via magnetism to the microposts to provide an active capture surface. Method 400 may include, but is not limited to, the following steps.

At a step 410, a microfluidic device having magnetically responsive, surface-attached microposts is provided. For example, microfluidic device 100 that includes a field or array of magnetically responsive, surface-attached microposts 122 is provided. In one example, microposts 122 are formed of any material, such as silicone elastomer integrated with a magnetically responsive material, in which a remnant magnetic field can be created.

At a step 415, a remnant magnetic field is generated in the surface-attached microposts. For example, an external magnet is used to magnetize microposts 122 in reaction (or assay) chamber 114. For example, an external magnet positioned in proximity to reaction (or assay) chamber 114 of microfluidic device 100 is used to create a latent magnetic field in microposts 122 as described hereinabove with reference to FIG. 6.

At a step 420, magnetically responsive capture beads are bound to the surface-attached microposts via magnetism. For example, a plurality of magnetically responsive capture beads 126 suspended in a buffer solution are flowed into reaction (or assay) chamber 114. In one example, capture beads 126 are superparamagnetic beads. As capture beads 126 are flowed into reaction (or assay) chamber 114, the latent magnetic field of microposts 122 attracts capture beads 126 to the microposts where they are bound via magnetism. Because capture beads 126 are flowed into a pre-magnetized reaction (or assay) chamber 114, capture beads 126 are evenly distributed on the surface of microposts 122.

At a step 425, a sample fluid is introduced into the reaction (or assay) chamber of the microfluidic device capture of a target. For example, a sample fluid that includes the target of interest is flowed into reaction (or assay) chamber 114 of microfluidic device 100. As the sample fluid is flowed into reaction (or assay) chamber 114, targets of interest in the sample fluid are bound to capture beads 126 immobilized on microposts 122. In this example, microposts 122 are static, i.e., not activated to motion.

In some embodiments, microposts 122 in reaction (or assay) chamber 114 are actuated using an actuation mechanism (e.g., actuation mechanism 150) to cause a stirring or mixing effect in the sample fluid. The stirring or mixing effect created by the actuated microposts 122 can be used to increase the capture rate of the target in the sample fluid.

At a step 430, the captured target of interest is released. In some embodiments, a captured target is released from capture beads 126 while the capture beads are magnetically bound to microposts 122. For example, a captured target is chemically released from capture beads 126 using a reaction that is based on the chemistry of the capture bead. In one example, a target such as a protein or an antibody is bound to a capture bead via a disulfide bond and released from the capture bead using dithiothreitol (DTT) reaction. In another example, a target, such as genomic DNA, is bound to the capture bead via a pH sensitive linkage, such as the ChargeSwitch reagent (available from Thermo Fisher Scientific) and released from the capture bead using a buffer exchange reaction (i.e., a change in buffer pH). In yet another example, a target, such as a nucleic acid, is bound to a capture bead using an oligonucleotide "bait" linker and enzymatically released from the capture bead using a restriction enzyme digestion to cleave the linker, thereby releasing the target nucleic acid.

In some embodiments, microposts 122 in reaction (or assay) chamber 114 are actuated using an actuation mechanism (e.g., actuation mechanism 150) to cause a stirring or mixing effect in the sample fluid as the captured target is chemically or enzymatically released from the micropost-bound capture beads 126. The stirring or mixing effect created by the actuated microposts 122 can be used to increase the release efficiency of the target from capture beads 126.

In some embodiments, capture beads 126 with the captured target of interest thereon are released from microposts 122. For example, capture beads 126 with the captured target thereon are released from microposts 122 using a degaussing procedure, e.g., using commercially available demagnetizing products that achieve degaussing by alternating electromagnetic field at varying frequencies, to decrease or substantially eliminate any remnant magnetic field of microposts 122. Because the remnant magnetic field of microposts 122 is decreased or substantially eliminated, capture beads 126 are no longer bound via magnetism to microposts 122.

Figure 8:
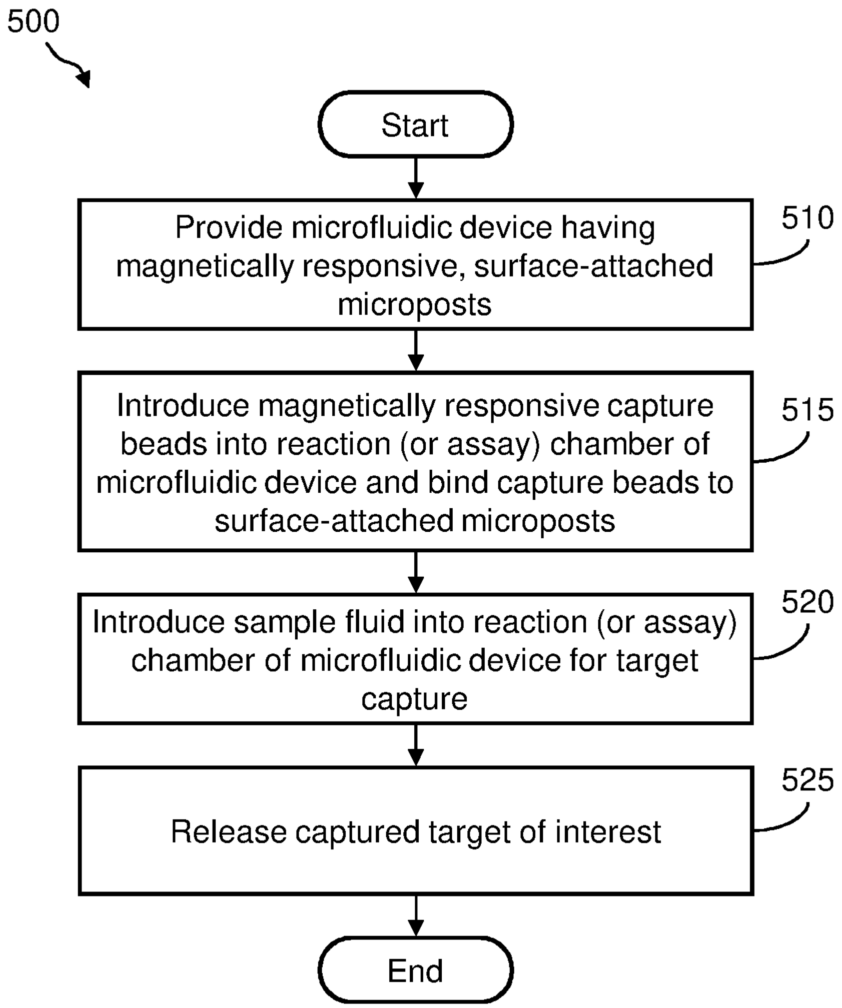
FIG. 8 illustrates a flow diagram of another example of a method of using the surface-attached posts and magnetically responsive capture beads in a microfluidic device for capture of a target of interest in a sample fluid.

FIG. 8 illustrates a flow diagram of another example of a method 500 of using surface-attached posts and magnetically responsive capture beads in a microfluidic device for capture of a target of interest in a sample fluid. In this example, capture beads 126 are first flowed into reaction (or assay) chamber 114 and then an actuating magnet is used to simultaneously magnetize surface-attached microposts 122 and attract capture beads 126 to the microposts where they are bound via magnetism to provide an active capture surface. Method 500 may include, but is not limited to, the following steps.

At a step 510, a microfluidic device having magnetically responsive, surface-attached microposts is provided. For example, microfluidic device 100 that includes a field or array of magnetically responsive, surface-attached microposts 122 is provided.

At a step 515, magnetically responsive capture beads are bound to the surface-attached microposts via magnetism. For example, a plurality of magnetically responsive capture beads 126 suspended in a buffer solution are flowed into reaction (or assay) chamber 114. A magnet (such as magnet 160 of FIG. 6) is arranged in proximity to microposts 122 in reaction (or assay) chamber 114 of microfluidic device 100. The magnet is used to generate a magnetic field of sufficient strength and duration to magnetize microposts 122 and attract capture beads 126 to the microposts. In one example, the magnet is a rotating permanent magnet (diametrically magnetized) that is positioned in proximity of the top substrate 112 of reaction (or assay) chamber 114 at a certain distance and rotation speed (e.g., 0.1 mm to 10 mm, or distance sufficient to generate field strengths greater than 30 mT, operating at rotation speeds varying from 1 to 160 Hz, and for a period of time (e.g., from about 30 seconds to about 600 seconds) to attract capture beads 126 to microposts 122 where they are bound via magnetism.

At a step 520, a sample fluid is introduced into the reaction (or assay) chamber of the microfluidic device for capture of a target of interest. For example, a sample fluid that includes the target of interest is flowed into reaction (or assay) chamber 114 of microfluidic device 100. As the sample fluid is flowed into reaction (or assay) chamber 114, targets of interest in the sample fluid are bound to capture beads 126 immobilized on microposts 122. In this example, microposts 122 are static, i.e., not activated to motion.

In some embodiments, microposts 122 in reaction (or assay) chamber 114 are actuated using an actuation mechanism (e.g., actuation mechanism 150) to cause a stirring or mixing effect in the sample fluid. The stirring or mixing effect created by the actuated microposts 122 can be used to increase the capture rate of the target in the sample fluid.

At a step 525, the captured target of interest is released. In some embodiments, the captured target is chemically or enzymatically released from capture beads 126 while the capture beads are magnetically bound to microposts 122 as described above in step 430 of method 400 of FIG. 7.

In some embodiments, microposts 122 in reaction (or assay) chamber 114 are actuated using an actuation mechanism (e.g., actuation mechanism 150) to cause a stirring or mixing effect in the sample fluid as the captured target is chemically or enzymatically released from the micropost-bound capture beads 126. The stirring or mixing effect created by the actuated microposts 122 can be used to increase the release efficiency of the target from capture beads 126.

In some embodiments, capture beads 126 with the captured target of interest thereon are released from microposts 122. For example, capture beads 126 with the captured target thereon are released from microposts 122 using a degaussing procedure, e.g., using commercially available demagnetizing products that achieve degaussing by alternating electromagnetic field at varying frequencies to decrease or substantially eliminate any remnant magnetic field of microposts 122. Because the remnant magnetic field of microposts 122 is decreased or substantially eliminated, capture beads 126 are no longer bound via magnetism to microposts 122.

Figure 9:
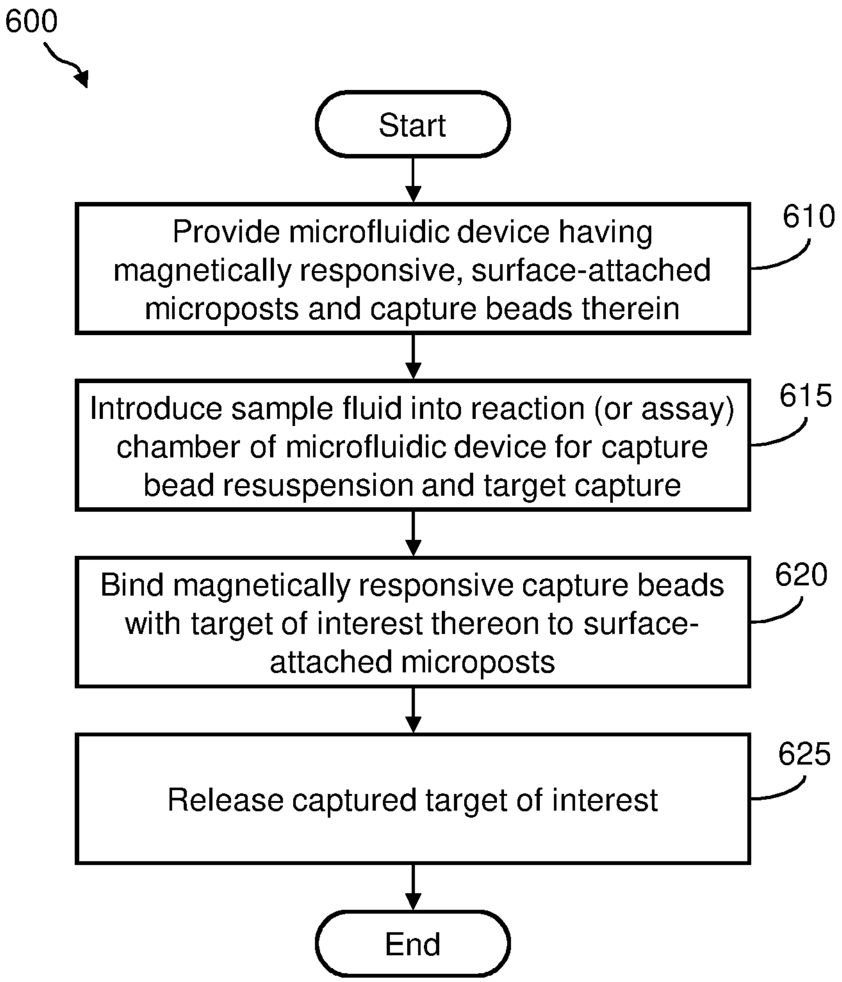
FIG. 9 illustrates a flow diagram of yet another example of a method of using the surface-attached posts and magnetically responsive capture beads in a microfluidic device for capture of a target of interest in a sample fluid.

FIG. 9 illustrates a flow diagram of yet another example of a method 600 of using surface-attached posts and magnetically responsive capture beads in a microfluidic device for capture of a target of interest in a sample fluid. In this example, a microfluidic device 100 is provided with a plurality of capture beads 126 lyophilized on a substrate surface that is opposite to the arrangement of microposts 122. Method 600 may include, but is not limited to, the following steps.

At a step 610, a microfluidic device having magnetically responsive, surface-attached microposts and a plurality of capture beads therein is provided. For example, microfluidic device 100 that includes a plurality of capture beads 126 lyophilized on a substrate surface that is opposite to the arrangement of microposts 122 is provided.

At a step 615, a sample fluid is introduced into the reaction (or assay) chamber of the microfluidic device for resuspension of the lyophilized capture beads and capture of a target of interest. For example, a sample fluid that includes the target of interest is flowed into reaction (or assay) chamber 114 of microfluidic device 100. As the sample fluid is flowed into reaction (or assay) chamber 114, lyophilized capture beads 126 in reaction (or assay) chamber 114 are resuspended and targets of interest in the sample fluid are bound to the resuspended capture beads 126.

At a step 620, the magnetically responsive capture beads with a target of interest bound thereon are bound to the surface-attached microposts via magnetism. For example, a magnet (such as magnet 160 of FIG. 6) is arranged in proximity to microposts 122 in reaction (or assay) chamber 114 of microfluidic device 100. The magnet is used to generate a magnetic field of sufficient strength and duration to magnetize microposts 122 and attract capture beads 126 to the microposts. In one example, the magnet is a rotating permanent magnet (diametrically magnetized) that is positioned in proximity of the top substrate 112 of reaction (or assay) chamber 114 at a certain distance and rotation speed (e.g., 0.1 mm to 10 mm, or distance sufficient to generate field strengths greater than 30 mT, operating at rotation speeds varying from 1 to 160 Hz), and for a period of time (e.g., from about 30 seconds to about 600 seconds) to attract capture beads 126 to microposts 122 where they are bound via magnetism.

At a step 625, the captured target of interest is released. In some embodiments, the captured target is chemically or enzymatically released from capture beads 126 while the capture beads are magnetically bound to microposts 122 as described above in step 430 of FIG. 7.

In some embodiments, microposts 122 in reaction (or assay) chamber 114 are actuated using an actuation mechanism to cause a stirring or mixing effect in the sample fluid as the captured target is chemically or enzymatically released from the micropost-bound capture beads 126. The stirring or mixing effect created by the actuated microposts 122 can be used to increase the release efficiency of the target from capture beads 126.

In some embodiments, capture beads 126 with the captured target of interest thereon are released from microposts 122. For example, capture beads 126 with the captured target thereon are released from microposts 122 using a degaussing procedure, e.g., using commercially available demagnetizing products that achieve degaussing by alternating electromagnetic field at varying frequencies, to decrease or substantially eliminate any remnant magnetic field of microposts 122. Because the remnant magnetic field of microposts 122 is decreased or substantially eliminated, capture beads 126 are no longer bound via magnetism to microposts 122.

In some embodiments, at step 610 of method 600, a remnant magnetic field is generated in the surface-attached microposts prior to resuspending the lyophilized capture beads 126. For example, an external magnet is used to magnetize microposts 122 in reaction (or assay) chamber 114. For example, an external magnet positioned in proximity to reaction (or assay) chamber 114 of microfluidic device 100 is used to create a remnant magnetic field in microposts 122 as described above with reference to FIG. 6.

In some embodiments, a capture bead is attached to a micropost using a functional group linker attachment process. In one example, the capture bead is a non-magnetic bead such as a silica bead or a polystyrene bead. In one example, a functional group linker such as an avidin (e.g., avidin, streptavidin, neutravidin)/biotin complexation interaction can be used to attach a capture bead to the surface-attached microposts. In another example, a carboxy group amine linkage can be used to bind a capture bead to the surface-attached microposts. The use of functional group linkers to attach binding agents to surface-attached microposts is described with reference to U.S. Patent App. No. 62/816,892, entitled "Methods of Surface Modification of Silicones for Specific Target and High Efficiency Binding," filed on Mar. 11, 2019; the entire disclosure of which is incorporated herein by reference. The U.S. Patent App. No. 62/816,892 describes methods of incorporating one or more functionalizing agents onto (into) the silicone-based material of the microposts; thereby providing a micropost surface for target-specific analyte capture. For example, a microposts processing platform is provided that is based on a microfluidic flow cell structure that includes a reaction (or assay) chamber. The method utilizes the microposts processing platform that includes an arrangement of surface-attached microposts on at least one surface of the reaction (or assay) chamber. Methods of functionalizing the surface-attached microposts include one or more steps, wherein the incorporation of one or more functionalizing agents are used to provide a micropost surface for target-specific analyte capture.

Figure 10:
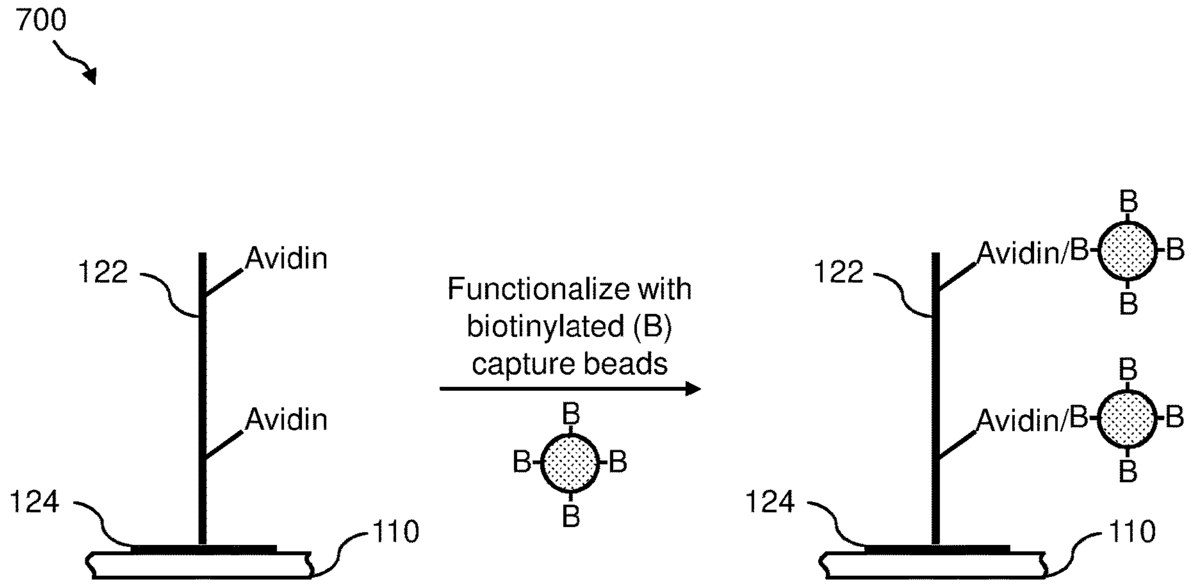
FIG. 10 illustrates an example of a process of functionalizing the surface-attached microposts of the presently disclosed microfluidic device with capture beads using a functional group linker.

FIG. 10 illustrates an example of a process 700 of functionalizing the surface-attached microposts of the presently disclosed microfluidic device with capture beads using a functional group linker. In this example, the micropost 122 is pre-functionalized with avidin end groups and then a biotinylated capture bead can bind to the micropost via formation of an avidin-biotin complex, wherein the capture bead can be used for specific capture a target species in a sample fluid.

Process 700 begins with an avidin functionalized micropost 122. An avidin molecule (e.g., avidin, streptavidin or neutravidin) may be bound to the surface of microposts 122 using, for example, the U.S. Patent App. No. 62/816,892, entitled "Methods of Surface Modification of Silicones for Specific Target and High Efficiency Binding." In this example, a single micropost 122 is shown, but a field or array of microposts 122 is typically used, wherein the field or array of microposts 122 may be configured to accommodate the attachment of capture beads of a certain size (or size range). Additionally, the length, diameter, geometry, composition, orientation, and/or pitch of microposts 122 in the field or array can be selected to accommodate the attachment of capture beads of a certain size (or size range).

A biotinylated (B) capture bead is attached to the surface of micropost 122 via the formation of an avidin-biotin bond. In some embodiments, the size, e.g., the diameter, of capture beads bound to the surface of micropost 122 may be of a uniform size (i.e., from a monodispersion of a capture beads). For example, a monodipsersion of capture beads may comprise a single size of capture beads that may range from about 10 nm to about 10 μm (or more) in diameter. In some embodiments, the capture beads bound to the surface of micropost 122 may be a mixture of capture beads with different particle sizes. For example, a mixture of different sized capture beads bound to micropost 122 may range from about 2 μm to about 2.9 μm.

In summary and referring again to FIG. 1A through FIG. 10, the presently disclosed microfluidic device 100, process 300, method 400, method 500, and/or method 600 includes actuatable microposts 122 that are functionalized with a magnetically responsive capture bead bound via magnetism, whereby the capture beads provide an "active" surface for specific binding an analyte of interest in a sample fluid.

In some embodiments, the presently disclosed microfluidic device 100 and process 700 include microposts 122 that are functionalized with a non-magnetically responsive capture bead using a functional group linker, whereby the capture beads provide an "active" surface for specific binding of an analyte of interest in a sample fluid.

In some embodiments, the presently disclosed microfluidic device 100, method 400, method 500, and/or method 600 includes capture bead-functionalized microposts 122 that are actuated via, for example, actuation mechanism 150. For example, capture bead-functionalized microposts 122 are compelled into motion via actuation mechanism 150. Accordingly, the mixing action and/or flow created by the actuated capture bead-functionalized microposts 122 is used to increase the capture rate of a target in a sample fluid.

In some embodiments, the presently disclosed microfluidic device 100, method 400, method 500, and/or method 600 includes capture bead-functionalized microposts 122 that are not actuated. For example, the actuatable capture bead-functionalized microposts 122 are held static.

In some embodiments (and referring now to method 400, method 500, and/or method 600), a captured target of interest bound to the presently disclosed capture bead-functionalized microposts 122 in microfluidic device 100 can be released from capture beads 126 using any method that suitable for the chemistry of the capture bead (e.g., a chemical reaction, an enzymatic reaction, a degaussing reaction).

In some embodiments, the presently disclosed microfluidic device 100, method 400, method 500, and/or method 600 includes capture bead-functionalized microposts 122 that are actuated via, for example, actuation mechanism 150. Accordingly, the mixing action and/or flow created by the actuated capture bead-functionalized microposts 122 is used to facilitate the release of a bound target from capture beads 126.

In some embodiments (and referring now to method 400, method 500, and/or method 600), a magnetically responsive capture bead 126 with bound target thereon in the presently disclosed in microfluidic device 100 can be released from microposts 122 using a degaussing procedure to decrease or substantially eliminate any remnant magnetic field of the microposts.

In some embodiments, the presently disclosed microfluidic device 100 with surface-attached microposts 122 can be provided to an end user at different stages of the capture-bead functionalization process depending on the end-user requirements. For example and referring to FIG. 7, microfluidic device 100 with surface-attached microposts 122 can be provided to an end user with capture beads bound to microposts 122 (i.e., capture beads are "pre-loaded" on the posts). In another example and referring to FIG. 8, microfluidic device 100 with surface-attached microposts 122 can be provided to an end user with no capture beads therein (or thereon) and capture beads 126 are flowed into the reaction (or assay) chamber 114 of microfluidic device 100 and bound to microposts 122 during end use. In yet another example and referring to FIG. 9, microfluidic device 100 with surface-attached microposts 122 can be provided to an end user with capture beads 126 dried on an opposing surface (i.e., on a surface opposite from the surface-attached microposts).

Capture bead-functionalized microposts 122 in reaction (or assay) chamber 114 of microfluidics device 100 can provide benefit in at least 2 ways—(1) binding of capture beads 126 to the surface of a micropost 122 provides a mechanism for using readily available pre-functionalized capture beads in a microfluidic reaction (or assay) chamber for specific capture of target of interest, and (2) the mixing action and/or flow created by the actuated capture bead-functionalized microposts 122 brings the analytes in a sample fluid rapidly into contact with the capture beads as compared with no actuation and/or diffusion alone. Because of these benefits, the capture efficiency and recovery of bound target of interest is increased compared with the use of unbound capture beads in a microfluidic environment.

Bead Spraying System and Method

Referring now to FIG. 11 through FIG. 20, an example of a bead spraying system and method is provided for spraying magnetically responsive and/or non-magnetically responsive beads atop and/or among a field of surface-attached microposts for use in a microfluidic device.

Figure 11:
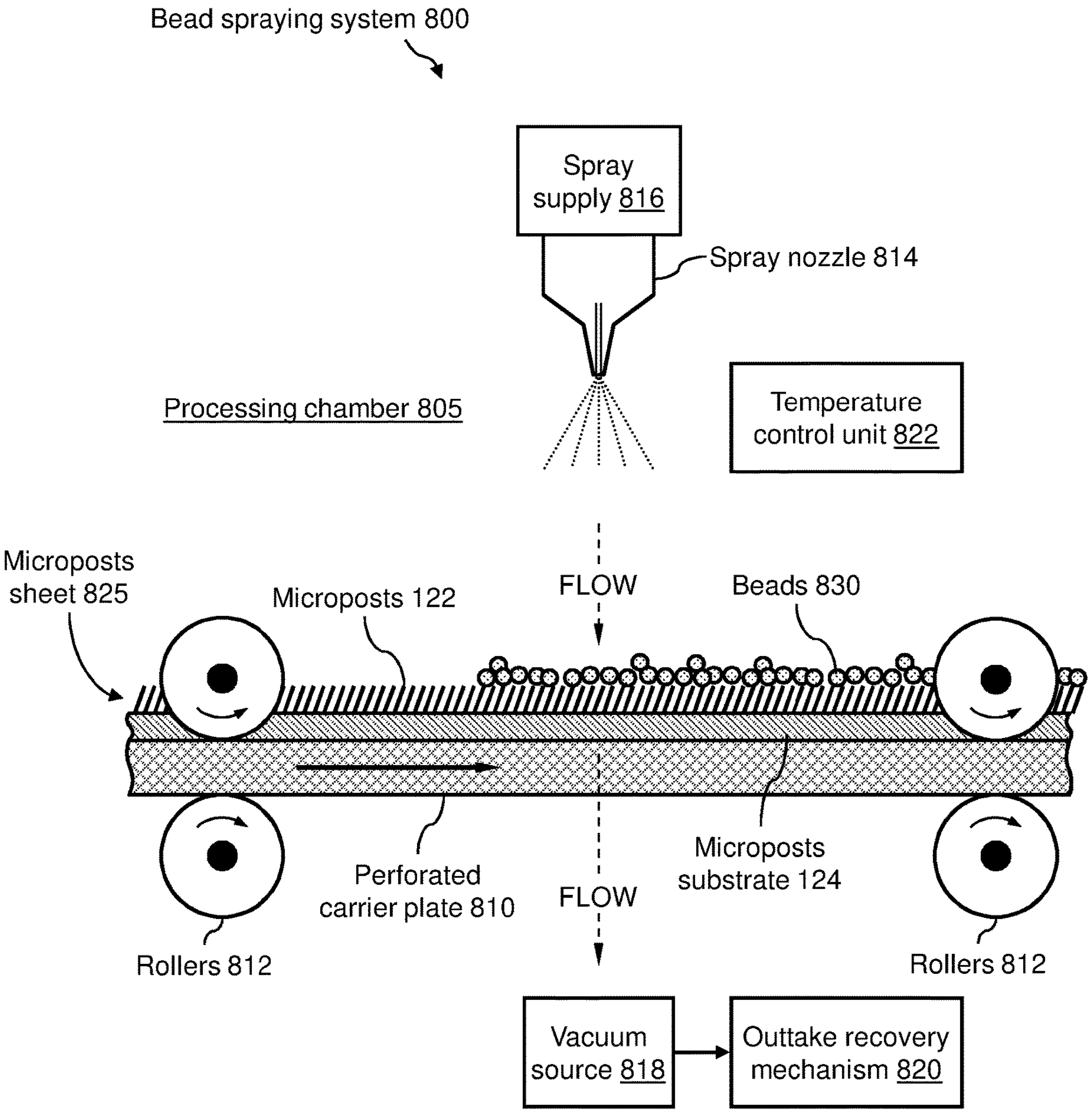
FIG. 11 illustrates a block diagram of an example of a bead spraying system for providing beads atop and/or among a field of surface-attached microposts in a microfluidic device.

FIG. 11 illustrates a block diagram of an example of a bead spraying system 800 for providing beads atop and/or among a field of surface-attached microposts in a microfluidic device. In this example, bead spraying system 800 may include a perforated carrier plate 810 supported by an arrangement of rollers 812 (e.g., motor powered rollers). A spray nozzle 814 that is fluidly coupled to a spray supply 816 may be provided a certain distance above perforated carrier plate 810. Further, a vacuum source 818 and an outtake recovery mechanism 820 is provided below perforated carrier plate 810. That is, vacuum source 818 and outtake recovery mechanism 820 are provided on the side of perforated carrier plate 810 that is opposite from spray nozzle 814. Further, the arrangement of perforated carrier plate 810, rollers 812, spray nozzle 814, spray supply 816, vacuum source 818, and outtake recovery mechanism 820 may be provided in a processing chamber 805 in which the process conditions may be controlled. Optionally, a temperature control unit 822 may be provided in processing chamber 805 for managing the temperature during evaporation.

In bead spraying system 800, a microposts sheet 825 may be provided atop perforated carrier plate 810 to be processed by spraying a quantity of beads 830 thereon. Microposts sheet 825 means a large-area bulk sheet of microposts substrate 124 with surface-attached microposts 122 thereon, i.e., a large-area bulk micropost field 120. Using the spraying operations of bead spraying system 800, a substantially uniform layer or "dusting" or "powder coating" of magnetically responsive and/or non-magnetically responsive beads 830 may be provided atop and/or among a field of surface-attached microposts 122 in a microfluidic device.

Figure 12:
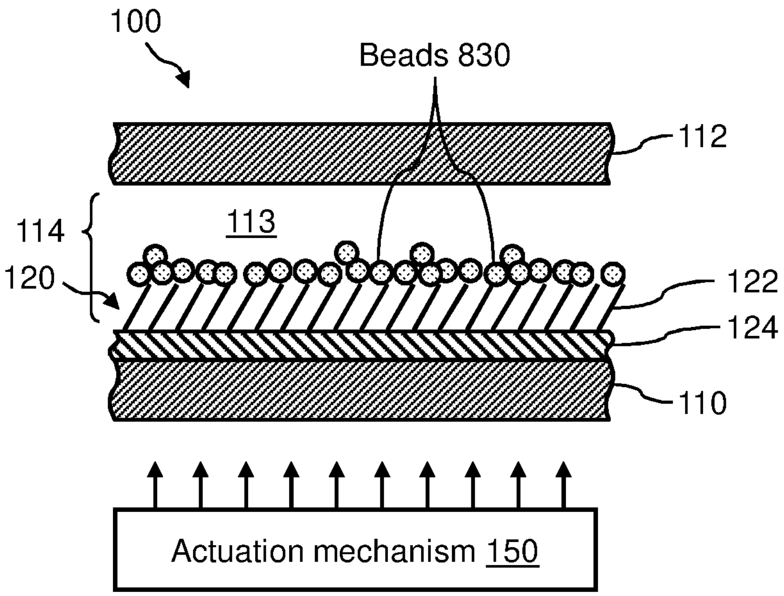
FIG. 12 illustrates a side view of a portion of the reaction (or assay) chamber of a microfluidic device including beads that have been sprayed atop and/or among a field of surface-attached microposts.

Once processed, microposts sheet 825 with the substantially uniform layer or "dusting" or "powder coating" of beads 830 thereon may be diced into individual micropost arrays for installing into individual microfluidics devices, such as microfluidics device 100 as shown in FIG. 12. For example, FIG. 12 shows a side view of a portion of reaction (or assay) chamber 114 of microfluidics device 100 including beads 830 that have been sprayed atop and/or among surface-attached microposts 122 of micropost field 120 via the spraying operations of bead spraying system 800. In this example, micropost field 120 with beads 830 is provided by dicing microposts sheet 825 with the substantially uniform layer or "dusting" or "powder coating" of beads 830 thereon. In, for example, microfluidics device 100, at run time, actuation mechanism 150 may be used to hold, for example, magnetically responsive beads 830 in place while reaction (or assay) chamber 114 is filled with fluid.

Further, in bead spraying system 800, spray nozzle 814 may be, for example, a laser-drilled, pressure-driven, air knife nozzle. Spray nozzle 814 may be fed by spray supply 816 that holds a quantity of magnetically responsive and/or non-magnetically responsive beads 830 in a volatile solvent and wherein the volatile solvent is the carrier fluid for beads 830. Accordingly, spray nozzle 814 must be compatible with the solution being sprayed. In one example, spray supply 816 may be a single reservoir holding both the beads 830 in the volatile solvent. In another example, spray supply 816 may be two reservoirs; one reservoir holding the beads 830 in another reservoir holding the volatile solvent. In this example, the beads 830 and the volatile solvent may be fed separately into spray nozzle 814 and then mixed in spray nozzle 814 during the spraying operation. Further, the outlets of spray nozzle 814 may be slightly larger than the bead diameter to ensure the desired bead dispersion. The diameter of beads 830 may be, for example, from about 100 nm to about 10 μm.

In bead spraying system 800, "volatile solvent" means a solvent that is prone to rapid evaporation. The volatile solvent may include, for example, non-ozone depleting chlorofluorocarbons (CFCs) or one of the alcohols (e.g., isopropyl or similar). Outtake recovery mechanism 820 may be, for example, a volatile substance recovery mechanism (e.g., a distiller unit that meets environmental regulatory standards) at the outtake of processing chamber 805. Again, temperature control unit 822 may be provided in processing chamber 805 for managing the temperature during evaporation of the volatile solvent from spray nozzle 814.

Vacuum source 818 may be any vacuum source for providing negative pressure in processing chamber 805. Vacuum source 818 is configured in processing chamber 805 to ensure airflow from spray nozzle 814 on one side of perforated carrier plate 810 toward outtake recovery mechanism 820 on the opposite side of perforated carrier plate 810. In one example, vacuum source 818 and outtake recovery mechanism 820 may be combined into a single unit or module. Further, bead spraying system 800 may be based, for example, on a roller airlock system wherein vacuum source 818 can make up for some amount of leakage around perforated carrier plate 810 and microposts sheet 825 entering and exiting processing chamber 805.

Further, the openings or holes in perforated carrier plate 810 facilitate the airflow in processing chamber 805 from spray nozzle 814 on one side of perforated carrier plate 810 to outtake recovery mechanism 820 on the opposite side of perforated carrier plate 810. That is, any openings or holes in perforated carrier plate 810 not covered by microposts sheet 825 facilitate the airflow in processing chamber 805. Examples of one or more microposts sheets 825 atop perforated carrier plate 810 and showing exposed portions of perforated carrier plate 810 for facilitating airflow are shown and described hereinbelow with reference to FIG. 13 through FIG. 16.

A main feature of bead spraying system 800 is that any carrier fluid leaving spray nozzle 814 may be substantially evaporated before reaching microposts sheet 825 and that substantially only the beads 830 reach microposts sheet 825.

Another main feature of bead spraying system 800 is that a substantially uniform layer or "dusting" or "powder coating" of beads 830 may be provided atop and/or among the field of surface-attached microposts 122 of microposts sheet 825.

Yet another main feature of bead spraying system 800 is that beads 830 may be provided loosely atop and/or among the field of surface-attached microposts 122 of microposts sheet 825 and wherein beads 830 are substantially not bound to the surface-attached microposts 122.

Still another main feature of bead spraying system 800 is that it may be used to support a large-scale continuous manufacturing process with respect to providing magnetically responsive and/or non-magnetically responsive beads atop and/or among a field of surface-attached microposts 122.

Certain operating considerations and/or parameters of bead spraying system 800 may include, but are not limited to, (1) the volatile solvent surface tension; (2) the droplet size at impact compared with the post-to-post spacing and/or the micropost diameter; (3) the bead diameter (e.g., from about 100 nm to about 10 μm); (4) the bead concentration in the volatile solvent; (5) the nozzle to substrate distance (i.e., the droplet travel distance); (6) the evaporation rate of the volatile solvent; (7) the evaporation temperature of the volatile solvent; (8) the dispensing rate of the spray nozzle 814; (9) the air currents in processing chamber 805; and (10) the horizontal translation rate of perforated carrier plate 810 with respect to spray nozzle 814 (e.g., perforated carrier plate 810 moving, spray nozzle 814 moving, or both moving).

An example of the operation of bead spraying system 800 may be summarized as follows. Using rollers 812, perforated carrier plate 810 holding microposts sheet 825 is advanced at a certain rate through processing chamber 805 while spray nozzle 814 is held stationary. (e.g., perforated carrier plate 810 moving, spray nozzle 814 moving, or both moving). Then, spray nozzle 814 is activated to release under pressure a mixture of volatile solvent and beads 830. In doing so, the differential pressure across spray nozzle 814 is used to cause the volatile solvent to flash-evaporate in the space between spray nozzle 814 and perforated carrier plate 810 such that substantially no droplets of volatile solvent reach microposts sheet 825. Accordingly, following flash-evaporation, substantially beads 830 only are propelled toward microposts sheet 825 at some velocity imparted by spray nozzle 814. Accordingly, a downward velocity and gravity assist to propel beads 830 toward microposts sheet 825. Via the openings in the exposed portions of perforated carrier plate 810 (i.e., around the edges of microposts sheet 825), the evacuation path (i.e., the volatile flow) is toward outtake recovery mechanism 820 via the vacuum force of vacuum source 818.

Generally, in bead spraying system 800 it may be beneficial to minimize air currents, minimize flight distance to microposts sheet 825, and optimize evaporating parameters to ensure uniform dispersion of beads 830. For example, it may be beneficial to provide ample space to draw vacuum through perforated carrier plate 810. Multiple downdrafts may be provided between and around one or more microposts sheets 825 positioned on perforated carrier plate 810 to ensure uniform dispersion of beads.

Figure 13:
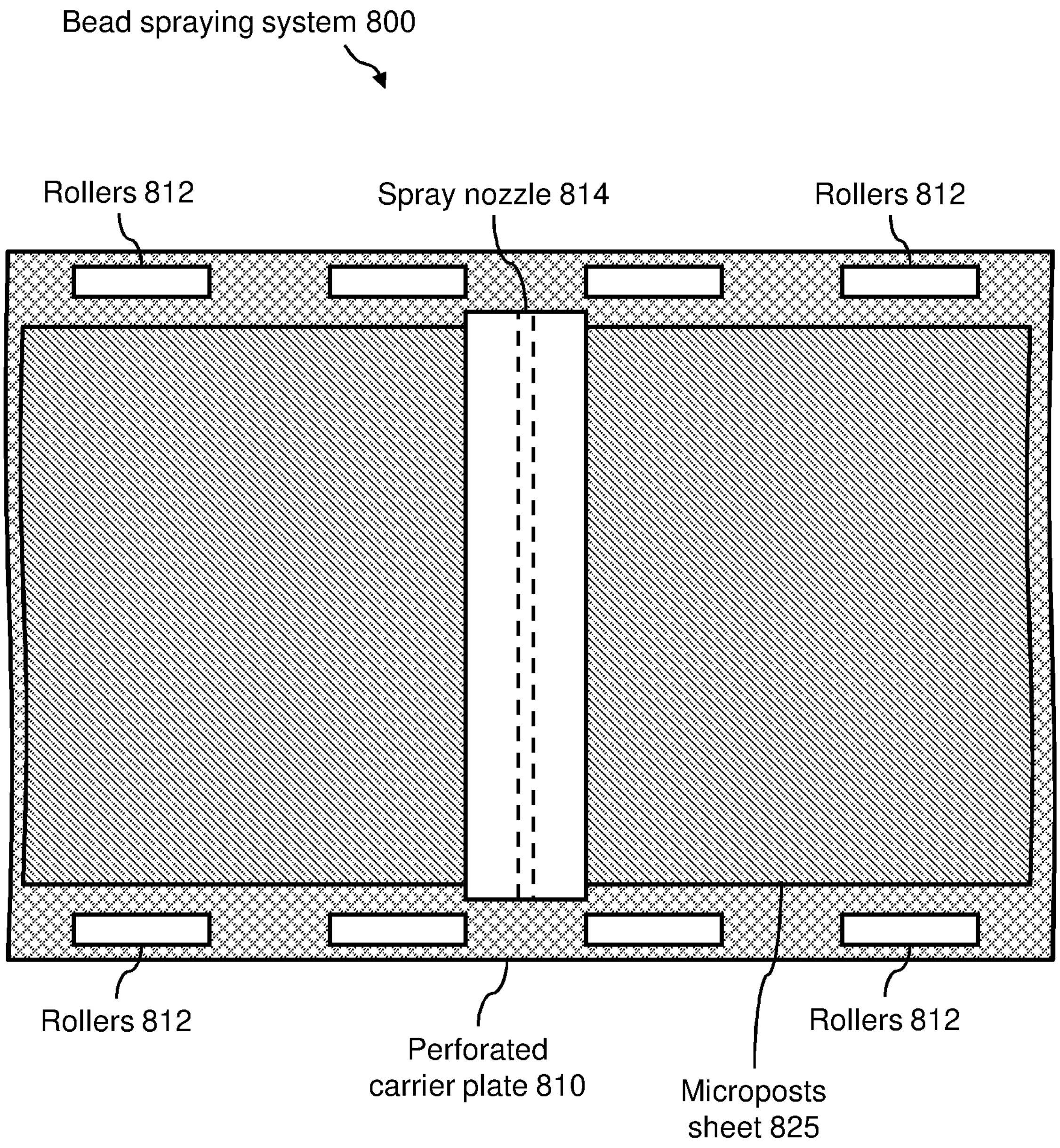
FIG. 13 through FIG. 16 illustrate top views of example configurations of microposts sheets positioned on a perforated carrier plate for optimizing downdrafts in the bead spraying system shown in FIG. 11.

Referring now to FIG. 13 through FIG. 16 is top views of example configurations of microposts sheets 825 positioned on perforated carrier plate 810 for optimizing downdrafts in bead spraying system 800. In one example, FIG. 13 shows a substantially continuous microposts sheet 825 that spans substantially the full width of perforated carrier plate 810 but leaving a portion of perforated carrier plate 810 exposed at the two edges of microposts sheet 825 to allow for adequate airflow (i.e., downdrafts).

Figure 14:
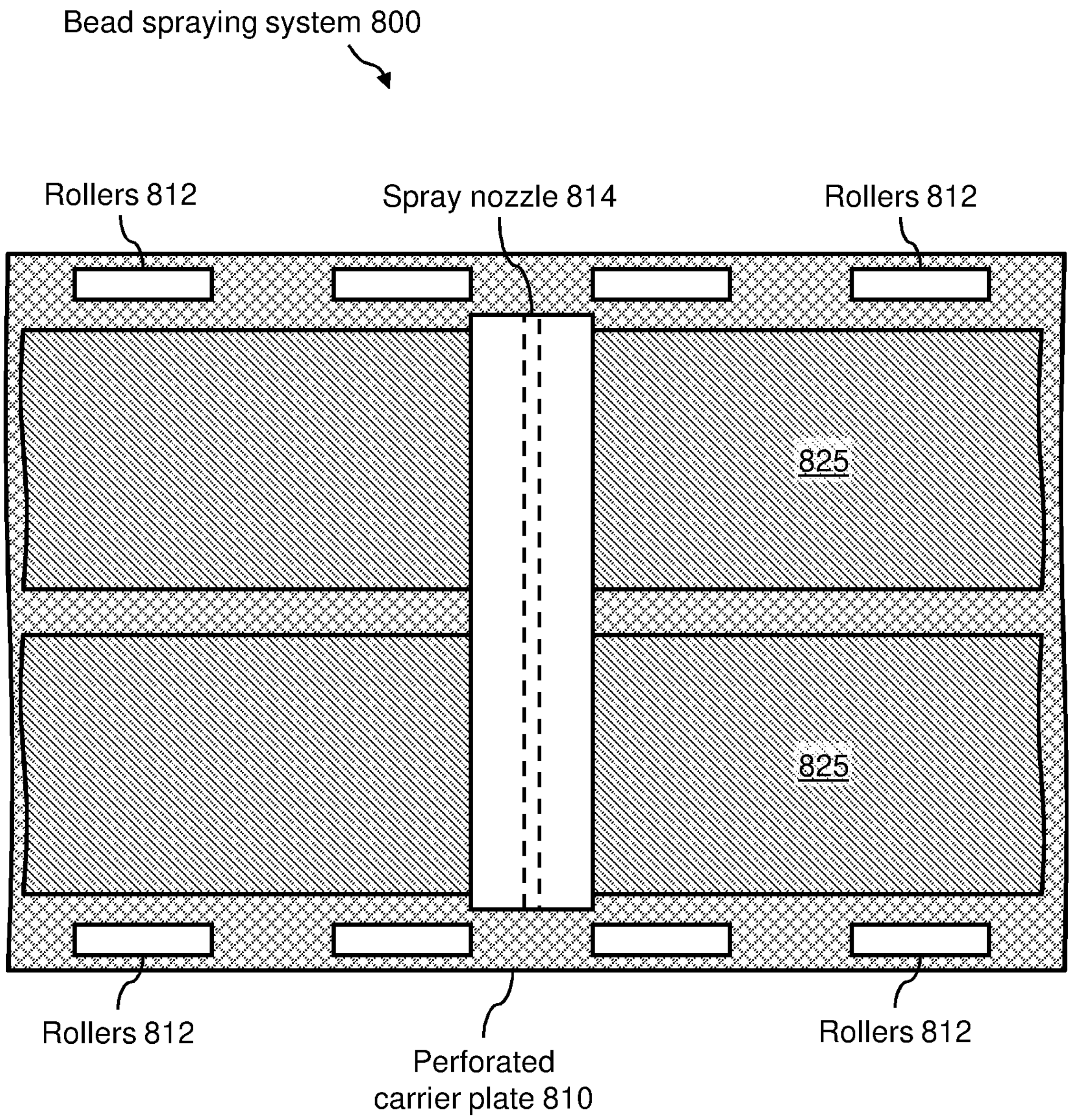

In another example, FIG. 14 shows two substantially continuous microposts sheets 825 with each spanning about half the width of perforated carrier plate 810 and leaving a portion of perforated carrier plate 810 exposed around and between the two strips of microposts sheets 825 to allow for adequate airflow (i.e., downdrafts).

Figure 15:
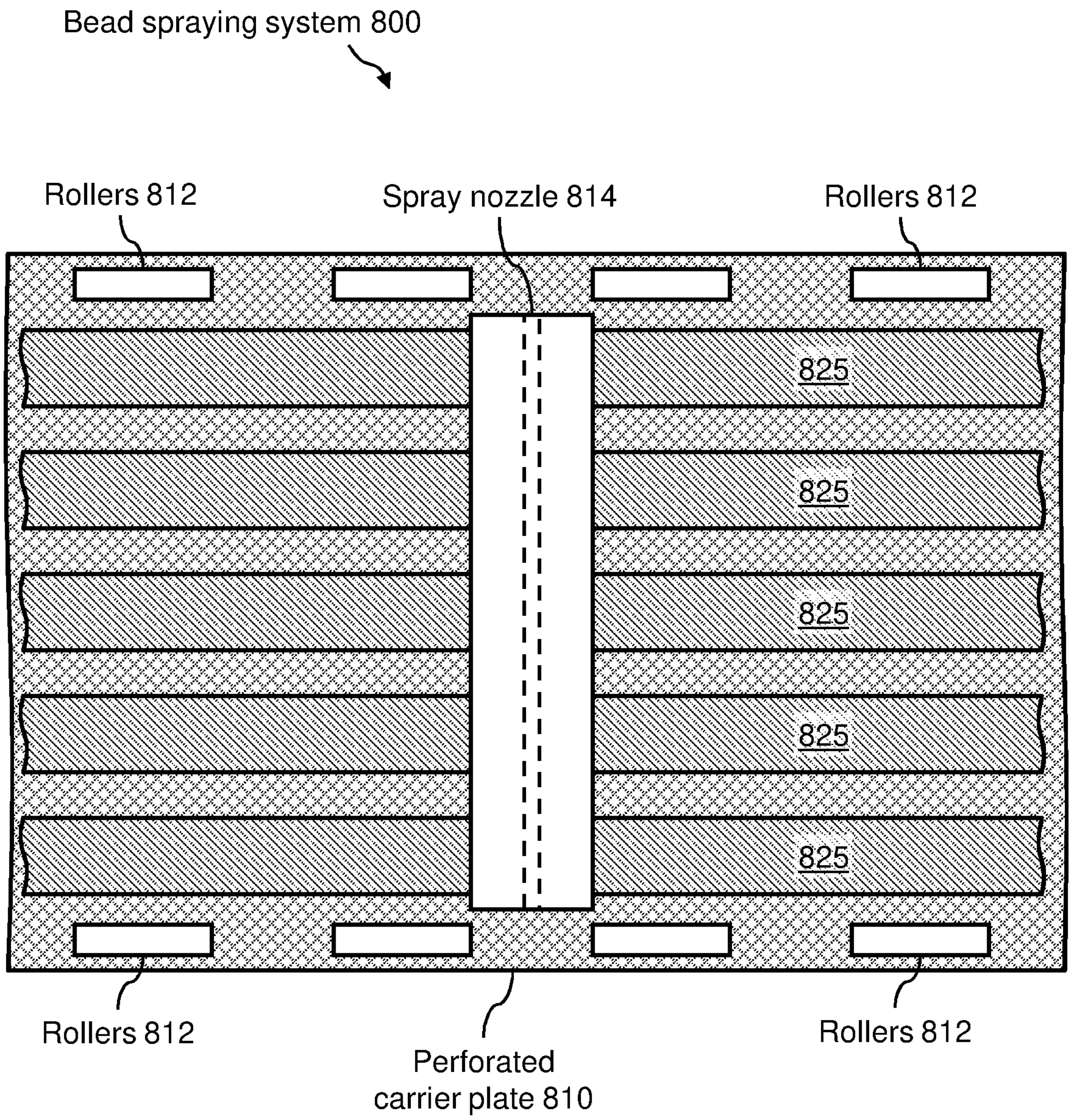

In yet another example, FIG. 15 shows multiple narrow continuous strips of microposts sheets 825 on perforated carrier plate 810 and leaving a portion of perforated carrier plate 810 exposed around and between the narrow strips of microposts sheets 825 to allow for adequate airflow (i.e., downdrafts). In one example, the width of the strips of microposts sheets 825 may correlate to the dimensions of the finished microfluidics devices, such as microfluidics device 100 as shown in FIG. 12.

Figure 16:
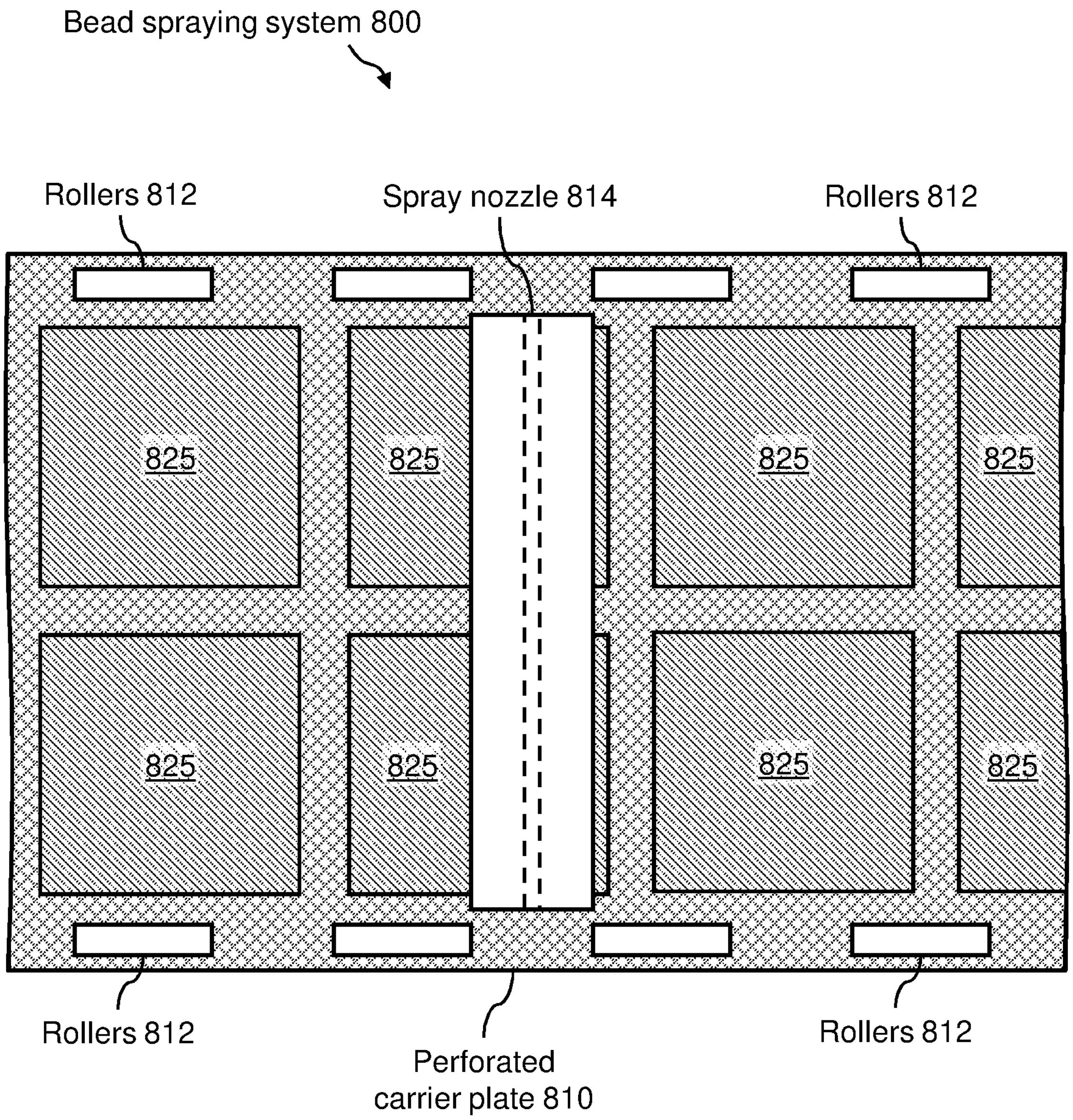

In yet another example, FIG. 16 shows multiple separate squares or patches of microposts sheets 825 on perforated carrier plate 810 and leaving a portion of perforated carrier plate 810 exposed around and between the squares or patches of microposts sheets 825 to allow for adequate airflow (i.e., downdrafts).

Referring still to FIG. 13 through FIG. 16, the exposed portions of perforated carrier plate 810 may be optimized for optimal airflow (i.e., downdrafts). That is, multiple downdrafts between and around microposts sheets 825 may help to ensure uniform dispersion of beads 830. In bead spraying system 800, a target minimum bead distribution may be specified for the center of each of the one or more microposts sheets 825 being processed. Further, the density of the beads 830 across the full area of each of the one or more microposts sheets 825 may vary slightly per some predetermined tolerance.

Figure 17:
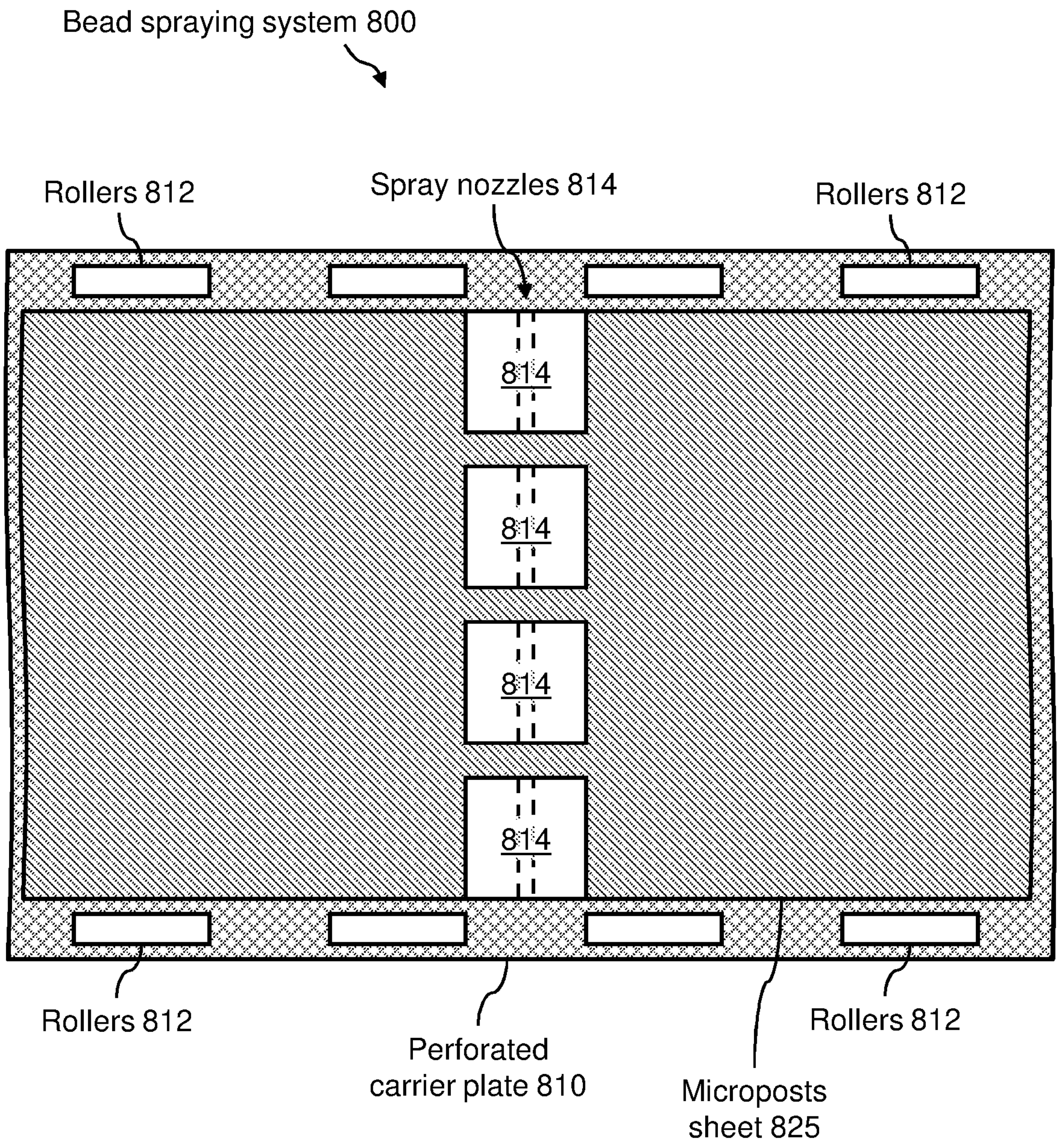
FIG. 17 illustrates a top view of example configuration of multiple spray nozzles in the bead spraying system shown in FIG. 11.

FIG. 13 through FIG. 16 show an example of bead spraying system 800 including one spray nozzle 814 that spans substantially the full width of perforated carrier plate 810. However, bead spraying system 800 is not limited to one spray nozzle 814 only. For example, FIG. 17 shows an example of bead spraying system 800 including a line of multiple spray nozzles 814 arranged with respect to perforated carrier plate 810. Further, the multiple spray nozzles 814 need not be arranged in a line. They may be arranged in any fashion and locations with respect to perforated carrier plate 810.

Figure 18A:
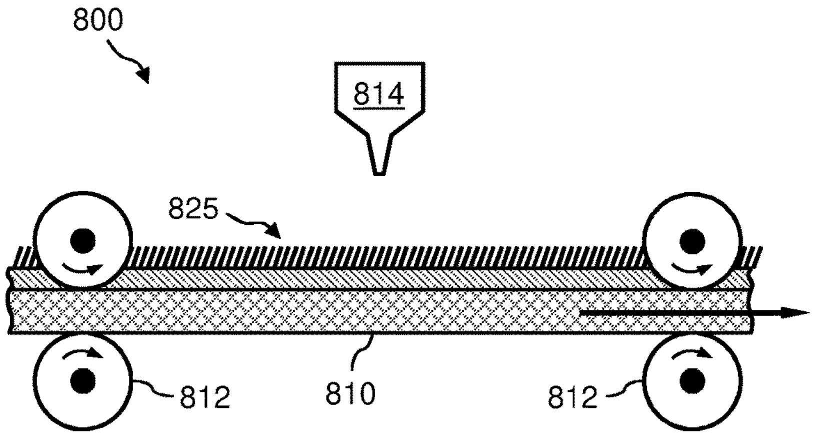
FIG. 18A, FIG. 18B, and FIG. 18C illustrate side views of example operating modes of the bead spraying system shown in FIG. 11.
Figure 18B:
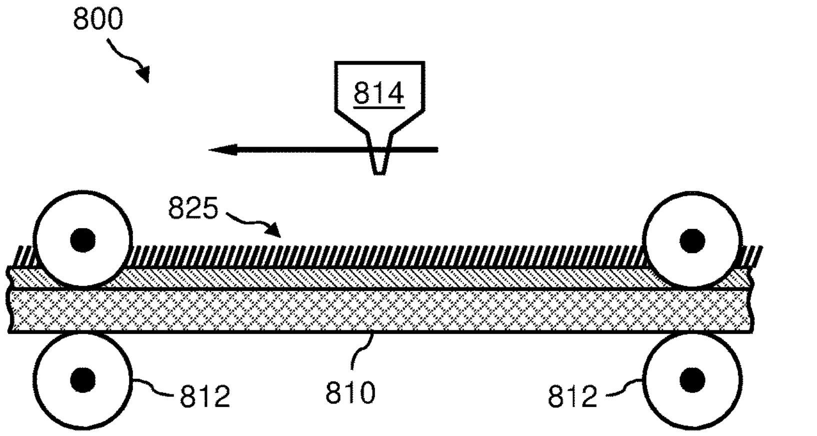
Figure 18C:
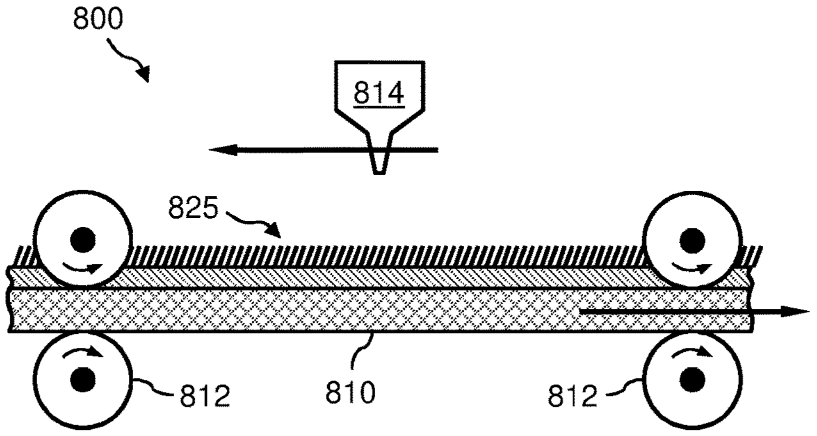

Further, in bead spraying system 800, the translation of perforated carrier plate 810 with respect to the spray nozzle 814 may vary as shown in FIG. 18A, FIG. 18B, and FIG. 18C. In one example, FIG. 18A shows an operating mode of bead spraying system 800 in which perforated carrier plate 810 is moving horizontally at a certain rate with respect to a spray nozzle 814 that is held fixed. In another example, FIG. 18B shows an operating mode of bead spraying system 800 in which spray nozzle 814 is moving horizontally at a certain rate with respect to a perforated carrier plate 810 that is held fixed. In yet another example, FIG. 18C shows an operating mode of bead spraying system 800 in which perforated carrier plate 810 is moving horizontally in one direction and spray nozzle 814 is moving horizontally in the opposite direction. In this example, there is a certain relative translation rate between perforated carrier plate 810 and spray nozzle 814.

Figure 19:
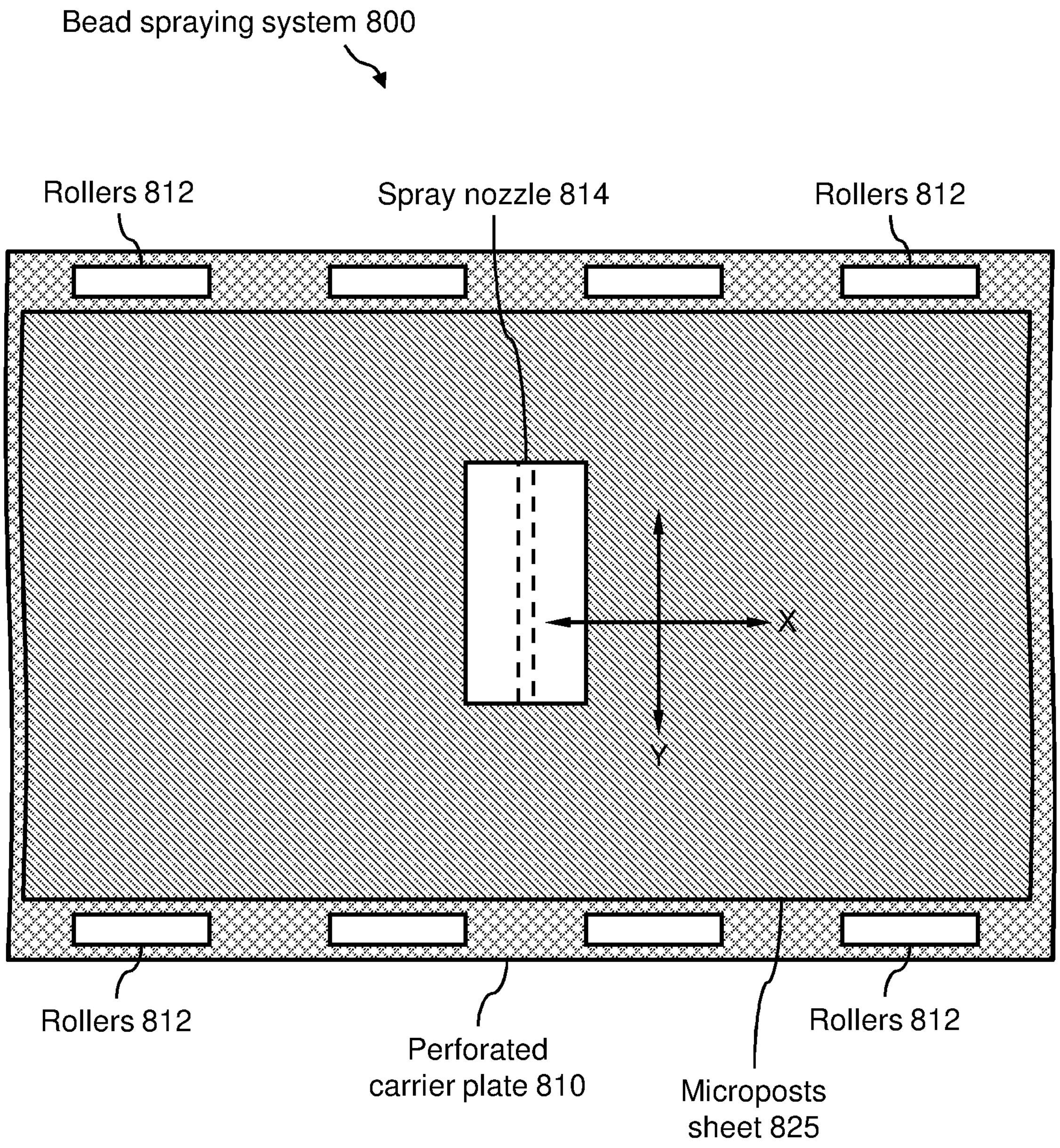
FIG. 19 illustrates a top view of an example of two-dimensional translation in the bead spraying system shown in FIG. 11.

Further, in bead spraying system 800, perforated carrier plate 810 and/or spray nozzle 814 is not limited to linear translation motion in one direction only. FIG. 19 shows an example of two-dimensional translation in bead spraying system 800. For example, perforated carrier plate 810 may be operating with an x-y translation stage, or spray nozzle 814 may be operating with an x-y translation stage, or both perforated carrier plate 810 and spray nozzle 814 are operating with an x-y translation stage.

Figure 20:
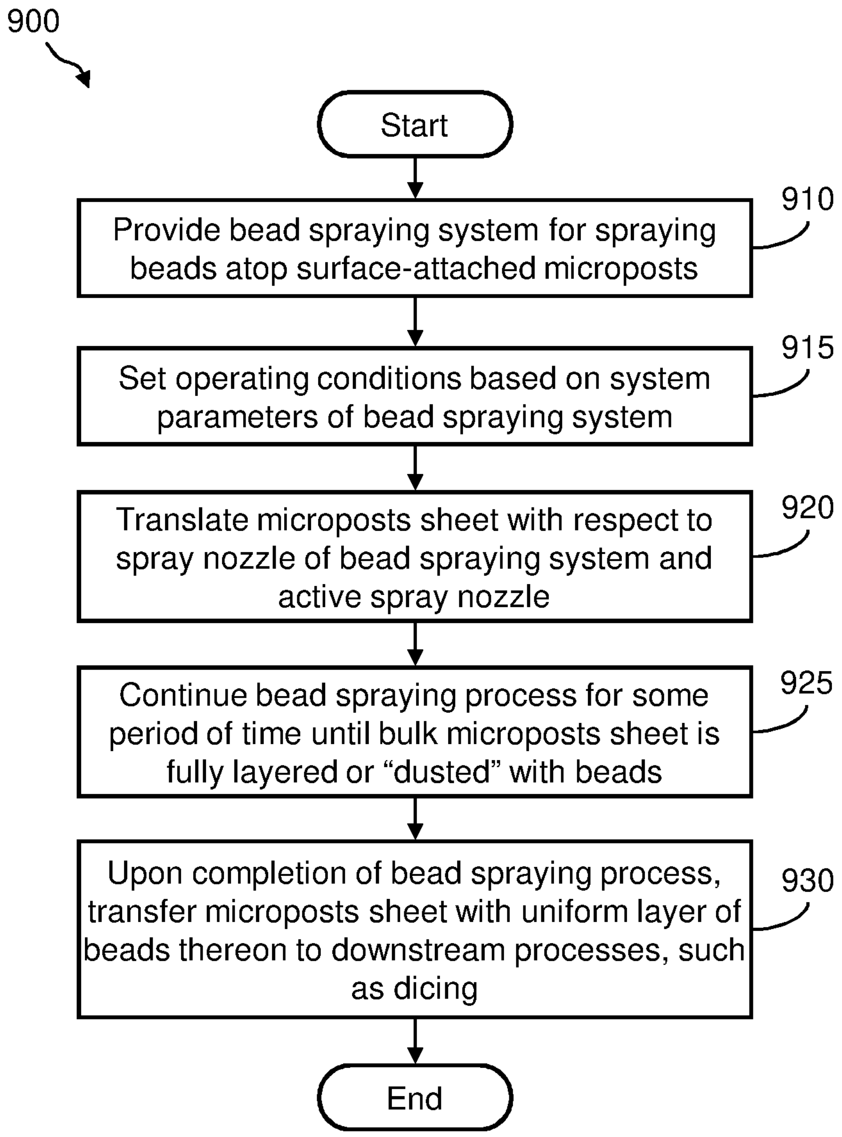
FIG. 20 illustrates a flow diagram of an example of a method of using the bead spraying system shown in FIG. 11 to provide beads atop and/or among a field of surface-attached microposts.

FIG. 20 illustrates a flow diagram of an example of a method 900 of using the presently disclosed bead spraying system 800 shown in FIG. 11 to provide beads 830 atop and/or among a field of surface-attached microposts 122. Method 900 may include, but is not limited to, the following steps.

At a step 910, a bead spraying system for spraying beads atop surface-attached microposts is provided. For example, the presently disclosed bead spraying system 800 is provided for spraying magnetically responsive and/or non-magnetically responsive beads 830 atop and/or among a field of surface-attached microposts 122, as described hereinabove with reference to FIG. 11 through FIG. 19.

At a step 915, the operating conditions of the bead spraying system are set based on the system parameters. In one example, the translation rate of perforated carrier plate 810 with respect to spray nozzle 814 is set based on certain system parameters, such as, but not limited to, (1) the volatile solvent surface tension; (2) the droplet size at impact compared with the post-to-post spacing and/or the micropost diameter; (3) the bead diameter (e.g., from about 100 nm to about 10 μm); (4) the bead concentration in the volatile solvent; (5) the nozzle to substrate distance (i.e., the droplet travel distance); (6) the evaporation rate of the volatile solvent; (7) the evaporation temperature of the volatile solvent; (8) the dispensing rate of spray nozzle 814; and (9) the air currents in processing chamber 805.

At a step 920, the microposts sheet is translated with respect to the spray nozzle of the bead spraying system and then the spray nozzle is activated. For example, by activating rollers 812, perforated carrier plate 810 holding one or more microposts sheets 825 (see FIG. 13 through FIG. 16) translate with respect to spray nozzle 814 and then spray nozzle 814 is activated to release its mixture of volatile solvent and beads 830 and provide a substantially uniform layer or "dusting" or "powder coating" of magnetically responsive and/or non-magnetically responsive beads 830 atop and/or among the field of surface-attached microposts 122 of the one or more microposts sheets 825.

At a step 925, the bead spraying process of the bead spraying system is continued for some period of time until the bulk microposts sheet is fully layered or "dusted" with beads. For example, the bead spraying process of bead spraying system 800 is continued for some period of time until the one or more microposts sheets 825 are fully layered or "dusted" with magnetically responsive and/or non-magnetically responsive beads 830.

At a step 930, upon completion of the bead spraying process, the microposts sheet now having a substantially uniform layer of beads thereon may be transferred to downstream processes, such as dicing. For example, upon completion of the bead spraying process, the operations of bead spraying system 800 are suspended. Then, the one or more microposts sheets 825, now having a substantially uniform layer of magnetically responsive and/or non-magnetically responsive beads 830 thereon, is removed from bead spraying system 800 and then transferred to any downstream processes, such as dicing. For example, the one or more microposts sheets 825, now having a substantially uniform layer of magnetically responsive and/or non-magnetically responsive beads 830 thereon, may be diced and the used to form individual microfluidics devices, such as microfluidics device 100 as shown in FIG. 12.

Referring still to bead spraying system 800 shown in FIG. 11 through FIG. 20, the magnetically responsive and/or non-magnetically responsive beads 830 maybe non-functionalized or functionalized. In the case of functionalized beads 830 it is important that the volatile solvent (i.e., carrier fluid) is compatible with the particular functionalization, the bead material, and so on.

Further, another example of a process for providing a substantially uniform layer of magnetically responsive and/or non-magnetically responsive beads 830 on bulk microposts sheets 825 in a large-scale continuous manufacturing process may be as follows. Roll a microposts sheet 825 into processing chamber 805 and then stop it. Then, inject one or multiple "puffs" of beads 830 into processing chamber 805, while giving each "puff" time to settle down by gravity onto microposts sheet 825. Then, move the sprayed microposts sheet 825 out of processing chamber 805. Then, translate in the next microposts sheet 825 to be processed. Then, repeat for any number of microposts sheets 825.

In summary and referring again to FIG. 11 through FIG. 20, the presently disclosed bead spraying system 800 and method 900 may be used to support a large-scale continuous manufacturing process with respect to providing magnetically responsive and/or non-magnetically responsive beads 830 atop and/or among a field of surface-attached microposts 122.

Further, bead spraying system 800 and method 900 provide a bead spraying process that utilizes a mixture of carrier fluid (e.g., volatile solvent) and magnetically responsive and/or non-magnetically responsive beads 830.

Further, bead spraying system 800 and method 900 provide a bead spraying process in which the carrier fluid is a volatile solvent that may substantially evaporate before reaching the field of surface-attached microposts 122 and leaving substantially only the magnetically responsive and/or non-magnetically responsive beads 830 reaching the microposts 122.

Further, bead spraying system 800 and method 900 provide a bead spraying process in which a substantially uniform layer or "dusting" or "powder coating" of magnetically responsive and/or non-magnetically responsive beads 830 may be provided atop and/or among a field of surface-attached microposts 122.

Further, bead spraying system 800 and method 900 provide a bead spraying process in which the magnetically responsive and/or non-magnetically responsive beads 830 may be provided loosely atop and/or among a field of surface-attached microposts 122 and wherein the beads 830 are substantially not bound to the surface-attached microposts 122.

Although the foregoing subject matter has been described in some detail by way of illustration and example for purposes of clarity of understanding, it will be understood by those skilled in the art that certain changes and modifications can be practiced within the scope of the appended claims.

What is claimed is:

1. A microfluidic cartridge comprising:

a. a housing forming a reaction chamber;

b. a field of actuatable surface-attached microposts provided on an interior surface of the housing and extending into the reaction chamber, wherein the actuatable surface-attached microposts are configured to move when actuated; and c. beads attached to the microposts; and wherein the beads comprise a core that is covered by a polymer shell and the polymer shell provides a surface for a subsequent functionalization reaction or reactions, and the core further comprises a magnetically-responsive material.

2. The microfluidic cartridge of claim 1, wherein the reaction chamber further comprises openings arranged for flowing fluid into and out of the chamber.

3. The microfluidic cartridge of claim 1, wherein the housing comprises two substrates separated to form the reaction chamber as a gap between the substrates.

4. The microfluidic cartridge of claim 1, wherein the beads are functionalized.

5. The microfluidic cartridge of claim 1, wherein the actuatable surface-attached microposts comprise magnetically-responsive microposts that can be actuated and moved using a magnetic actuation mechanism.

6. The microfluidic cartridge of claim 1, wherein the beads comprise target-specific beads, wherein the target-specific beads are pre-functionalized with a binding agent that is specific for one or more targets of interest, the pre-functionalized beads are bound to the actuatable urface-attached microposts using a functional group linker or using a lyophilization process or via non-specific adsorption of the beads to the microposts, and the microposts are maintained in an upright orientation by the lyophilization process.

7. The microfluidic cartridge of claim 1, wherein a chemical bonding reaction is used to adhere a magnetically-responsive bead to the surface of a micropost, and wherein the chemical bonding reaction is selected from the group consisting of an avidin/biotin complexation interaction or a carboxy group/amine linkage.

8. The microfluidic cartridge of claim 1, wherein a remnant (latent) magnetic field is generated in the actuatable surface-attached microposts, thereby attracting and binding the beads to the microposts via magnetism.

9. The microfluidic cartridge of claim 1, wherein the beads are bound to at least one substrate surface of the reaction chamber by an ambient magnetic field.

10. The microfluidics cartridge of claim 1, wherein the polymer shell is selected from the group consisting of a polystyrene or a silica-based material.

11. An instrument comprising:

a. an actuation mechanism, and b. the microfluidic cartridge of claim 1, wherein the actuation mechanism generates an actuation force thereby compelling at least a portion of the actuatable surface-attached microposts to move, and wherein the actuation force is selected from the group consisting of a magnetic, thermal, sonic, and/or electric force.

12. The instrument of claim 11, wherein the actuatable surface-attached microposts are functionalized with the beads for specific binding of one or more targets of interest.

13. The instrument of claim 11, wherein the microposts are pre-magnetized to create a magnetic field in the microposts and then magnetically-responsive beads are bound to the microposts, whereby the beads provide a surface for binding one or more targets of interest, and wherein the beads comprise a superparamagnetic material.

14. The instrument of claim 11, wherein the bead is pre-coupled with a ligand, and wherein the ligand is selected from the group consisting of an antibody, a protein, an antigen, a DNA/RNA probe, or any other molecule with an affinity for one or more targets of interest.

15. A method of capturing a target, the method comprising:

a. providing the instrument of claim 11;

b. causing a sample comprising the target to flow through the reaction chamber; and c. causing the actuation mechanism to generate an actuation force thereby compelling at least a portion of the actuatable surface-attached microposts to move, thereby causing the target to bind to the beads.

16. The method of claim 15, further comprising:

a. causing a wash buffer to flow through the reaction chamber; and b. causing the actuation mechanism to generate an actuation force thereby compelling at least a portion of the actuatable surface-attached microposts to move, thereby washing the beads.

17. The method of claim 15, further comprising:

a. causing an elution buffer to flow through the reaction chamber; and b. causing the actuation mechanism to generate an actuation force thereby compelling at least a portion of the actuatable surface-attached microposts to move, thereby eluting the target from the beads.

* * * * *